United States Patent [19]

Vujic

[11] Patent Number: 5,267,276
[45] Date of Patent: Nov. 30, 1993

[54] NEUTRON TRANSPORT ANALYSIS FOR NUCLEAR REACTOR DESIGN

[75] Inventor: Jasmina L. Vujic, Lisle, Ill.

[73] Assignee: The University of Chicago, Chicago, Ill.

[21] Appl. No.: 792,145

[22] Filed: Nov. 12, 1991

[51] Int. Cl.$^5$ .............................................. G21C 7/36
[52] U.S. Cl. ...................................... 376/215; 376/216
[58] Field of Search ............... 376/254, 255, 215, 216, 376/217

[56] References Cited

U.S. PATENT DOCUMENTS 4,877,575 10/1989 Impink, Jr. et al. ................. 376/216
4,990,302 2/1991 Oda et al. ............................ 376/216

OTHER PUBLICATIONS

*Collision Probability Method in Arbitrary Geometries: Preliminary Results,* Vujic et al., Summary of paper to be presented at the 1990 ANS Winter Metting, Nov. 11-15, 1990, Washington, D.C.

*Primary Examiner*—Donald P. Walsh
*Assistant Examiner*—Frederick H. Voss
*Attorney, Agent, or Firm*—Emrich & Dithmar

[57] ABSTRACT

Replacing regular mesh-dependent ray tracing modules in a collision/transfer probability (CTP) code with a ray tracing module based upon combinatorial geometry of a modified geometrical module (GMC) provides a general geometry transfer theory code in two dimensions (2D) for analyzing nuclear reactor design and control. The primary modification of the GMC module involves generation of a fixed inner frame and a rotating outer frame, where the inner frame contains all reactor regions of interest, e.g., part of a reactor assembly, an assembly, or several assemblies, and the outer frame, with a set of parallel equidistant rays (lines) attached to it, rotates around the inner frame. The modified GMC module allows for determining for each parallel ray (line), the intersections with zone boundaries, the path length between the intersections, the total number of zones on a track, the zone and medium numbers, and the intersections with the outer surface, which parameters may be used in the CTP code to calculate collision/-transfer probability and cross-section values.

17 Claims, 23 Drawing Sheets

INTEGRATION OVER φ

INTEGRATION OVER R

Fig. 9a
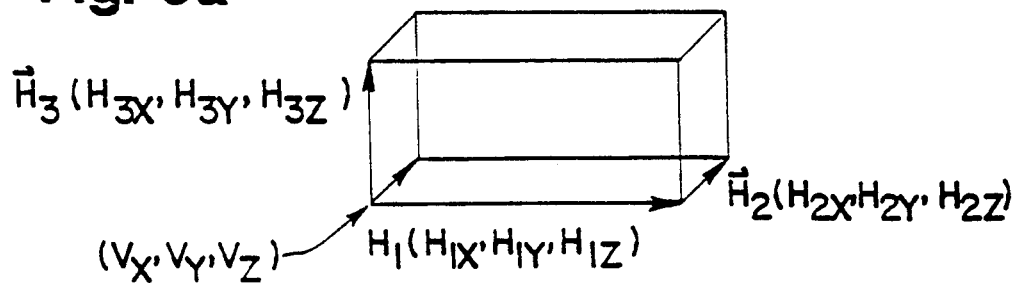
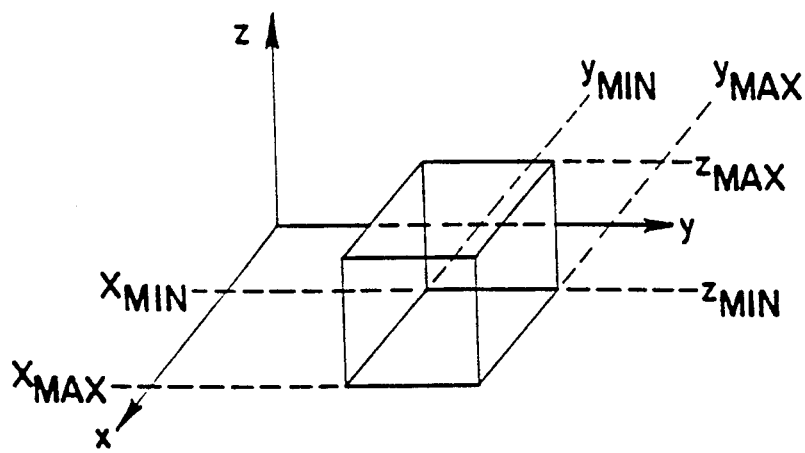
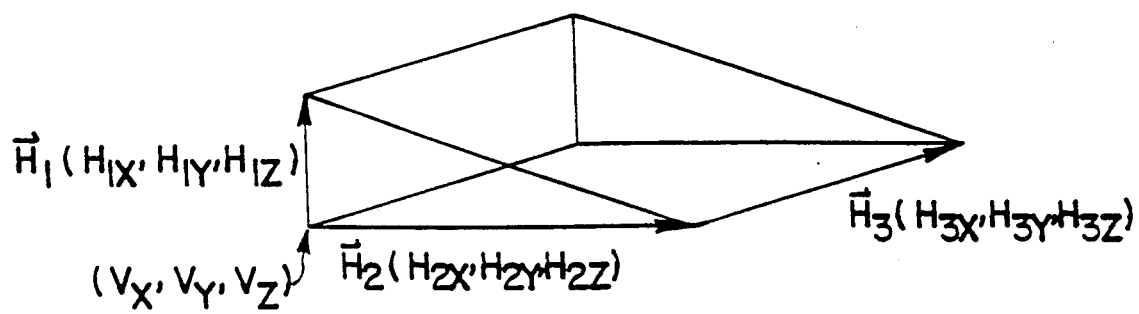

Fig. 9b
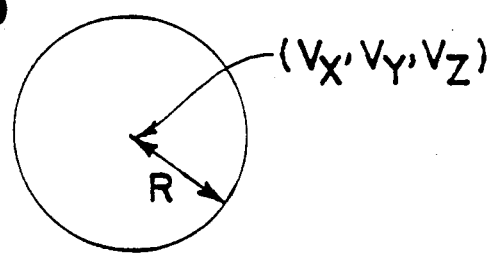
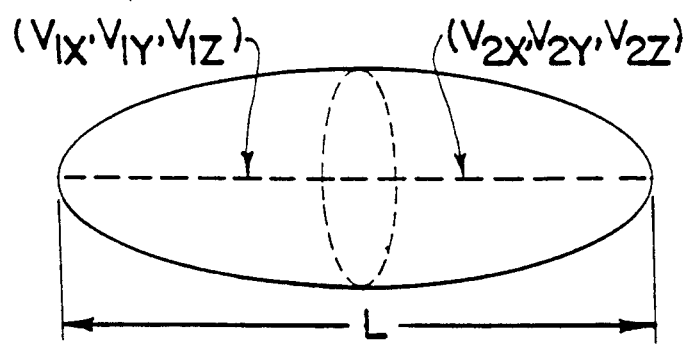
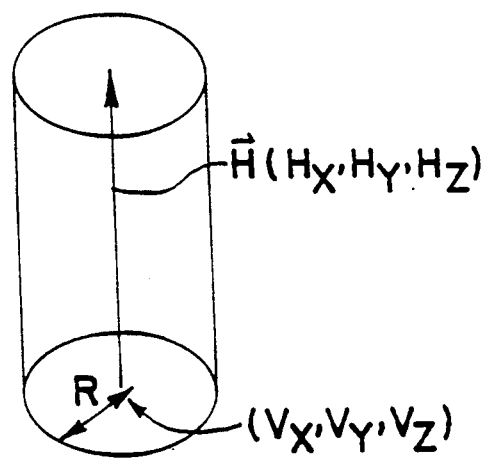

Fig. 9b (cont'd)
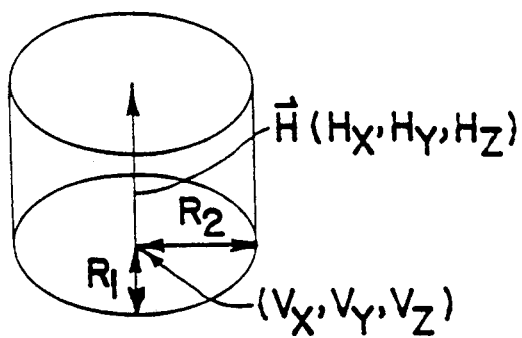
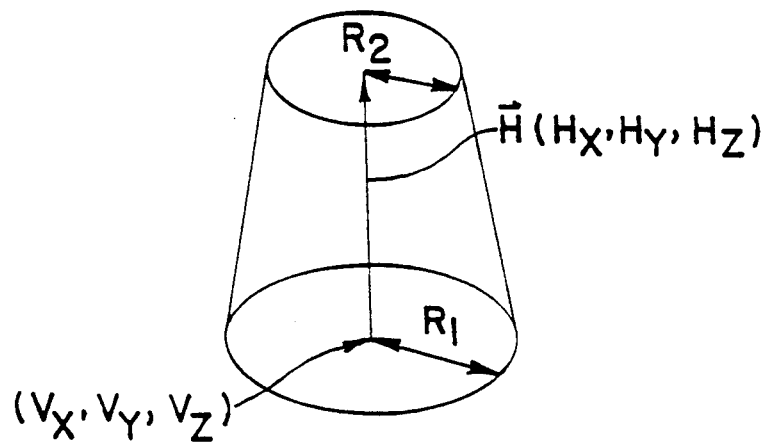
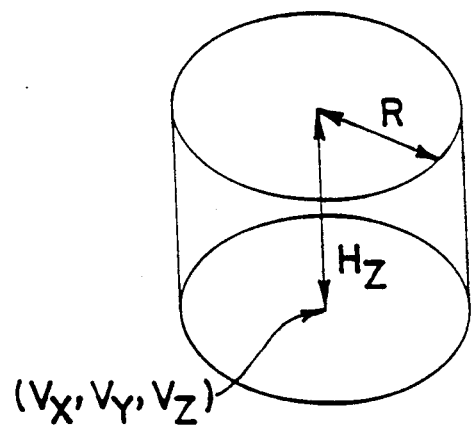

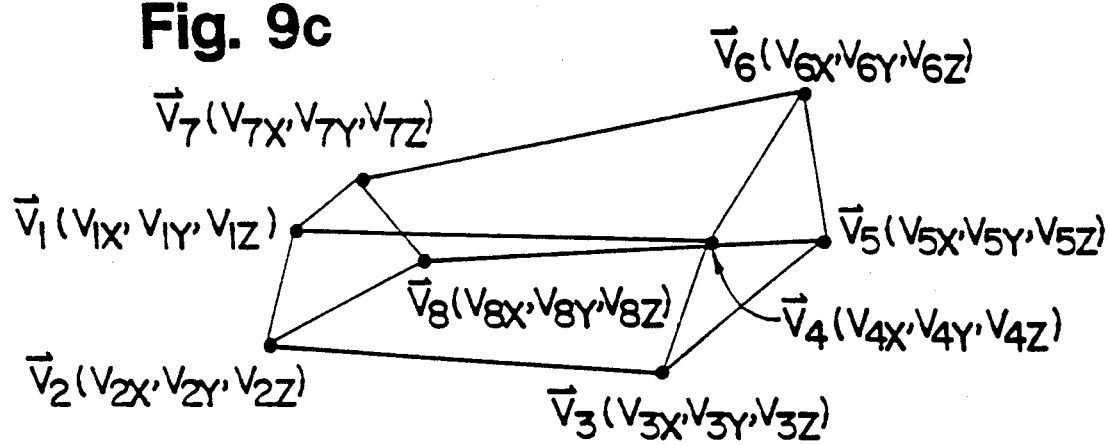
Fig. 9c
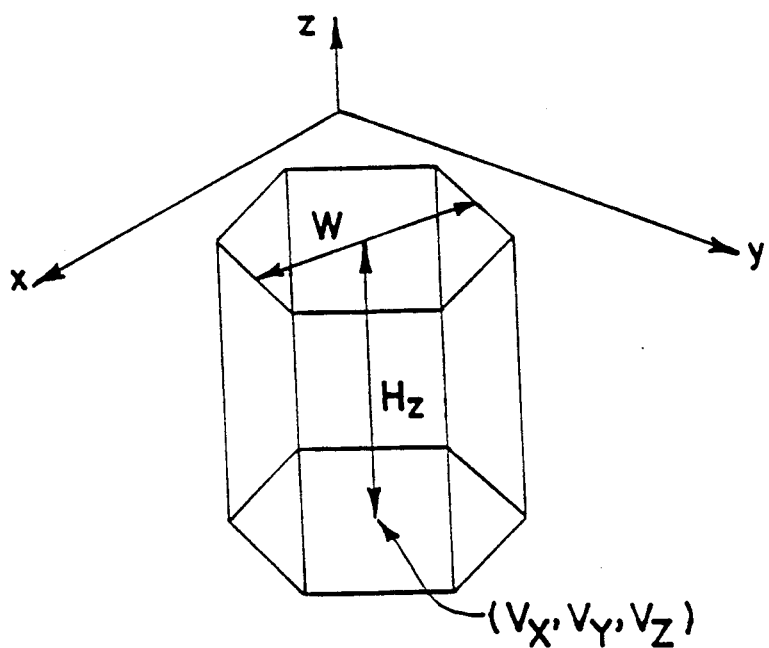

```
#user=b40299
#QSUB  -r gtran2           # jobname
#QSUB  -q w                # jobclass:  u, w, x, y
#QSUB  -1T 600             # CPU time limit in sec
#QSUB  -1M 6Mw             # Memory limit
#QSUB  -eo                 # Error file and standard out
#QSUB  -nr                 # No restart after shutdown
#QSUB
ja                         # Start job accounting
banner  "$QSUB_REQNAME"
qstat -f $QSUB_REQID   | expand
set -xvS
cp /n2/b40299/main.f main.f
cp /n2/b40299/tpgeom.f tpgeom.f
cp /n2/b40299/tpxy.f tpxy.f
cf77 -o gtran2.exe  -Wf" -d p " -- main.f tpgeom.f\
     tpxy.f
ja -csft
```

Fig. 13

```
#user=b40299
#QSUB  -r gtran2           # jobname
#QSUB  -q w                # jobclass:  u, w, x, y
#QSUB  -1T 600             # CPU time limit in sec
#QSUB  -1M 6Mw             # Memory limit
#QSUB  -eo                 # Error file and standard out
#QSUB  -nr                 # No restart after shutdown
#QSUB
ja                         # Start job accounting
banner  "$QSUB_REQNAME"
qstat -f $QSUB_REQID   | expand
set -xvS
cp /n2/b40299/tf8.in.bwrb TPXY.IN
cp /n2/b40299/tpgb.in/tpg.in144.48 TPG.IN
gtran2.exe<TPG.IN>GOUT
ls -C
mv GOUT  /n2/b40299/gout.144.48
#dispose GOUT -mOS t'outlim=99999,sysout=A,dest=3800'
mv GTIME  /n2/b40299/gtime.144.48
rm T*   fort*
ja -csft
```

Fig. 14

```
/*                          */
/* Turn on trace so we can see what's happening   */
trace results /* Must specify Version Test if that's what we want  */
/* (Version Current is default)  */

'OBTAIN VERSION   TEST'

'LINK  * 198 198 MR'
if rc ^=0 then do
   say 'Unable to link to 198'
   exit
end
'ACCESS  198 C'

'FORTVS  MAIN     (AUTODBL  (DBLPAD)  OPT(3) '
'FORTVS  TPGEOM  (AUTODBL  (DBLPAD)  OPT(3)'
'FORTVS  TPXY     (AUTODBL  (DBLPAD)  OPT(3) VEC(LEV(2))'

'LIBS  FORTRAN   ESSL  FORTAUX'

'LOAD  MAIN  TPGEOM   TPXY  (CLEAR'

'GENMJOD   GTRAN2'
exit
```

Fig. 15

```
/*                          */
/* Turn on trace so we can see what's happening   */
trace results /* Must specify Version Test if that's what we want  */
/* (Version Current is default)  */

'OBTAIN VERSION   TEST'

'LINK  * 198 198 MR'
if rc ^=0 then do
   say 'Unable to link to 198'
   exit
end
'ACCESS  198 C'

'FILEDEF       * CLEAR'
'FILEDEF       5 DISK  TPG  IN *'
'FILEDEF       6 DISK  GRTRAN2  OUT  C'
'FILEDEF       9 DISK  GTIME  OUT9  C'
'FILEDEF      16 DISK  TPG  TMP *'
'FILEDEF      20 DISK  TPXY  IN *'
'FILEDEF      45 DISK  TPG  OUT  C'
'FILEDEF      81 DISK  GTRAWN2  OUT81  C'

'GTRAN2'
exit
```

Fig. 16

```

ULIBS   = -lsys
DIRS    = $$HOME/.../b40299/lib
gtran2.exe:   main.o tpxy.o tpgeom.o
        f77 -O4 -o main.obj  main.o tpxy.o tpgeom.o \
        -L$(DIRS)   $(ULIBS)
tpxy.o:  tpxy.f
        f77 -c -O4 tpxy.f  >>out12 2>&1
main.o:  main.f
        f77 -c -O4 main.f  >>out12 2>&1
tpgeom.o:  tpgeom.f
        f77 -c -O4 tpgeom.f  >>out12 2>&1
```

Fig. 17

```

gtran2.exe:   main.o tpxy.o tpgeom.o ftimes.o
        xlf -o gtran2.exe main.o tpxy.o tpgeom.o \
        ftimes.o -lc -lessl
ftimes.o:  ftimes.c
        xlc -c ftimes.c  >out12 2>&1
tpxy.o:  tpxy.f
        xlf -O -c tpxy.f  >>out12 2>&1
main.o:  main.f
        xlf -O -c main.f  >>out12 2>&1
tpgeom.o:  tpgeom.f
        xlf -O -c tpgeom.f  >>out12 2>&1
```

Fig. 18

```
TIT TFU=296 TMO=296 * 1/8 of assembly,jas5   test, fuel+water
CON 28,40/1.2/1.2/1.2/1.2
XEN 2
COO 1.005/1001=11.19 8000=88.81
FUE 1 10.4025/2.556268 92238=85.5909 92234=0.8000=11.85284
PWR 3 1.25984 *1/8 of assembly
PIN 1 .409575 .6/'1''COO'
LPI
1
1 1
```

| 1 | 2 | 3 |
|---|---|---|
| 4 | 5 | 6 |
| 7 | 8 | 9 |

1 x 1 MESH PER PIN CELL

| 31 | 32 | 33 | 34 | 35 | 36 |
|----|----|----|----|----|----|
| 25 | 26 | 27 | 28 | 29 | 30 |
| 19 | 20 | 21 | 22 | 23 | 24 |
| 13 | 14 | 15 | 16 | 17 | 18 |
| 7  | 8  | 9  | 10 | 11 | 12 |
| 1  | 2  | 3  | 4  | 5  | 6  |

2 x 2 MESHES PER PIN CELL

| 73 | 74 | 75 | 76 | 77 | 78 | 79 | 80 | 81 |
|----|----|----|----|----|----|----|----|----|
| 64 | 65 | 66 | 67 | 68 | 69 | 70 | 71 | 72 |
| 55 | 56 | 57 | 58 | 59 | 60 | 61 | 62 | 63 |
| 46 | 47 | 48 | 49 | 50 | 51 | 52 | 53 | 54 |
| 37 | 38 | 39 | 40 | 41 | 42 | 43 | 44 | 45 |
| 28 | 29 | 30 | 31 | 32 | 33 | 34 | 35 | 36 |
| 19 | 20 | 21 | 22 | 23 | 24 | 25 | 26 | 27 |
| 10 | 11 | 12 | 13 | 14 | 15 | 16 | 17 | 18 |
| 1  | 2  | 3  | 4  | 5  | 6  | 7  | 8  | 9  |

3 x 3 MESHES PER PIN CELL

| 1 | 2 | 3 |
|---|---|---|
| 4 | 5 | 6 |
| 7 | 8 | 9 |

EDIT REGION NUMBERS

ZONE NUMBERS FOR CASE 4
EDIT REGION NUMBERS FOR CASE 4, 5, & 6

ZONE NUMBERS FOR CASE 5

ZONE NUMBERS FOR CASE 6

Fig. 28
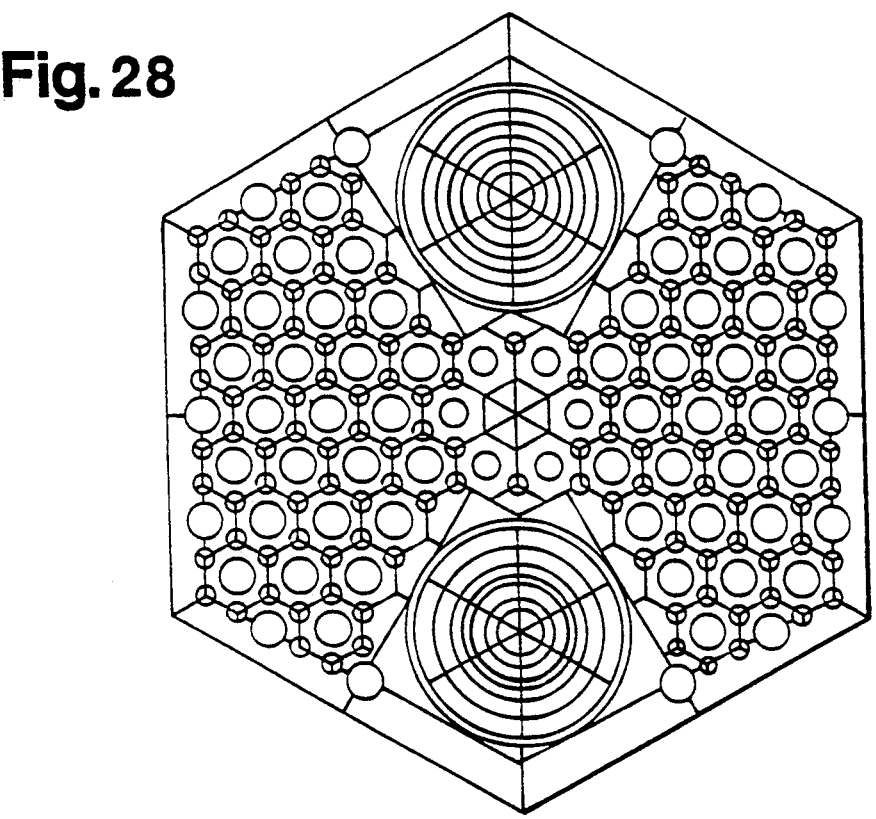
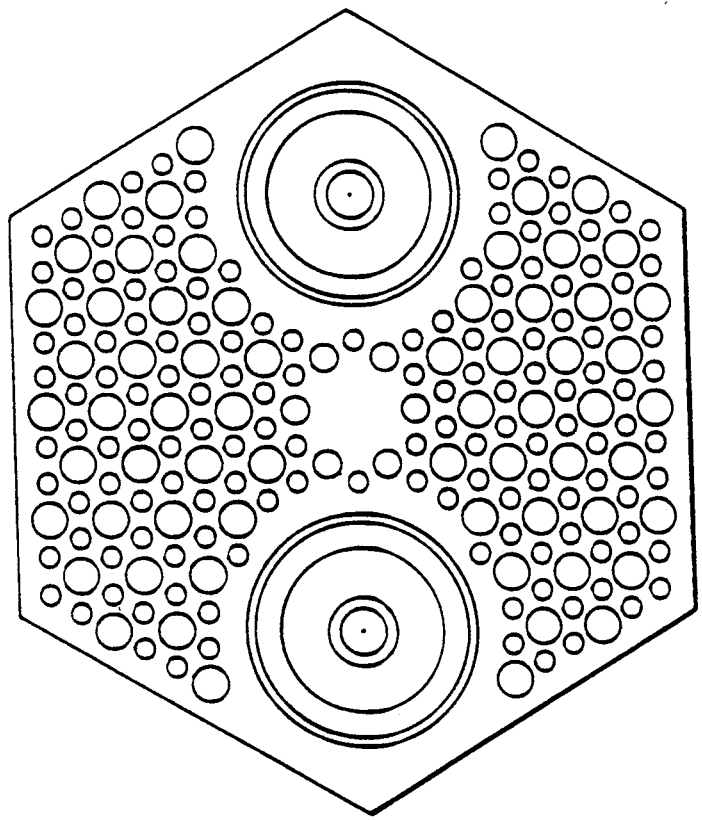

NEUTRON TRANSPORT ANALYSIS FOR NUCLEAR REACTOR DESIGN

Contractual Origin of the Invention

The United States Government has rights in this invention pursuant to Contract No. W-31-109-ENG-38 between the U.S. Department of Energy and The University of Chicago representing Argonne National Laboratory.

Field of the Invention

This invention relates generally to considerations in the design and control of nuclear reactors and is particularly directed to neutron transport analysis in the general geometry of a nuclear reactor.

BACKGROUND OF THE INVENTION

GTRAN2 is a two dimension (2D) general geometry multigroup neutron transport code which combines the geometric flexibility of Monte Carlo (MC) codes with the computational efficiency of deterministic codes. Due to its geometrical flexibility, this code can be used for calculations of reactors with complex geometrical features. This code is based on the exact collision probability (CP) formalism for the solution of the integral form of the neutron transport equation. This method is considered to be very accurate, but several major limitations have prevented its broader utilization over the past three decades. Some of these limitations are briefly summarized in the following paragraphs.

Computer memory limitation. The spatial coupling of all regions in the global domain results in large and dense CP matrices. Very fine meshing is required for some problems, since the CP method gains accuracy with increasing subdivision of the regions. The number of meshes that can be treated is severely limited by the available computer memory, since the number of CP matrix elements increases as $N_r^2 \times N_g$, with $N_r$ being the total number of meshes, and $N_g$ being the total number of energy groups. As an example, consider a domain divided into 500 meshes. For a 12-group problem, the CP matrix will consist of $500 \times 500 \times 12 = 3 \times 10^6$ double precision elements, requiring 24 Mbytes of memory.

Computational cost limitation. Calculation of the CP matrix is the most time-consuming part of the entire calculation in the lattice codes based on this method. Moreover, the CPU time increases rapidly with the increased mesh refinement needed to achieve high accuracy in the CP calculations. The calculation of the CP matrices can sometimes require more than 95% of the total CPU time.

Isotropic scattering limitation. With the assumption of isotropic neutron scattering and isotropic sources, integration over the angular variable in the integral transport equation can be carried out easily, and a simplified equation for the scalar flux is obtained. If linearly anisotropic scattering is assumed, the number of eigenvalue equations in 2D is increased to three and the number of large CP matrices to nine, to account for higher order flux moments. This is prohibitively expensive and no code has been developed which accounts for linearly anisotropic neutron scattering in two-dimensional geometries.

Geometry limitation. The geometrical portion of the CP calculation includes determination of the intersection points between straight lines and region boundaries, i.e., surfaces. The usual procedure was to write a different algorithm for each different geometry, resulting in lattice codes with limited applicability.

In order to remedy some of the above mentioned limitations, several related methods were developed in the early seventies, based on the so called interface-current formalism. In order to replace large and dense CP matrices with sparse matrices, regions were decoupled, usually on the pin cell level, and coupled only to the neighboring regions through interface currents. In these methods some accuracy had to be sacrificed, because some additional approximations on the pin cell interfaces had to be made.

The present invention overcomes the aforementioned limitations of the prior art by providing a method for determining neutron transport in a nuclear reactor which is more accurate than previous methods and which can be used for virtually any advanced reactor design, thus saving man-years of effort. The inventive method is also faster than the prior approaches, and thus more cost efficient, and allows for highly precise analysis of complicated and irregular nuclear reactor assemblies in one, two or three dimensions.

OBJECTS AND SUMMARY OF THE INVENTION

Accordingly, it is an object of the present invention to provide a better understanding of the behavior and transport of neutrons in a nuclear reactor.

It is another object of the present invention to provide high computation efficiency of neutron cross-sections, reaction rates and other constants for any region of an assembly in a nuclear reactor for use in overall reactor calculations.

Yet another object of the present invention is to facilitate solving problems in the area of nuclear reactor physics more accurately and quickly by modifying a collision probability method (CPM) code by certain geometrical aspects of a geometric Monte Carlo (GMC) code.

A further object of the present invention is to provide a better understanding of neutron cross-section, reaction rates and other nuclear reactor parameters in newer, more complex reactor assemblies.

A still further object of the present invention is to provide a tool for the analysis and design of existing light water reactors (LWR) as well as any future reactor assembly designs including MHTGR.

Another object of the present invention is to provide a method for accurately and quickly determining multigroup, steady-state neutron integral transport characteristics in arbitrary two-dimensional geometries for use in analyzing and designing virtually any type and configuration of nuclear reactor.

These objects of the present invention are achieved and the disadvantages of the prior art are eliminated by a new transport theory method utilized in GTRAN2 based on a modified collision probability (CP) method. The novel method consists of replacing the geometry independent ray tracing (the most serious limitation in the CP method) by ray tracing based on the combinatorial geometry used in Monte Carlo codes, which permits an exact description of complicated and irregular nuclear reactor assemblies in one, two or three-dimensions. The advantage over the Monte Carlo ray tracing is that the geometric part is decoupled from the rest of the calculations, i.e., the geometrical pre-processing is done only once, and the calculated data are repeatedly used for all energies and all time steps. As a consequence, GTRAN2 is several orders of magnitude faster than Monte Carlo codes and provides more accurate results than heretofore available.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various FIGURES, in which:

FIGS. 9a, 9b and 9c illustrate various combinatorial geometry body descriptions used in the present invention;

FIG. 13 illustrates a procedure to generate an executable GTRAN2 file on a Cray X-MP/18 computer;

FIG. 14 illustrates a procedure to execute GTRAN2 on a Cray X-MP/18 computer;

FIG. 15 illustrates a procedure to generate an executable GTRAN2 file on an IBM 3090/600J computer;

FIG. 16 illustrates a procedure to execute a GTRAN2 on an IBM 3090/600J computer;

FIG. 17 illustrates a procedure to generate an executable GTRAN2 file on a Sun SPARCstation;

FIG. 18 illustrates a procedure to generate an executable GTRAN2 file on the IBM RISC 6000 workstation;

FIG. 20 illustrates the CASMO-3 input used to generate cross-sections for the PWR test problem;

FIG. 21 illustrates the zone and edit region numbers for homogenized PWR cases;

FIG. 28 illustrates the zone and edit region layouts for the NP-MHTGR assembly.

DETAILED DESCRIPTION OF THE PREFERRED EMBODIMENTS

Outline of the Collision/Transfer Probability Method

The neutron transport equation is a linearized form of the more general Boltzmann equation from gas dynamics. Knowing that the analytical solution of this equation can be found only for very idealized problems, many methods have been developed to find approximate numerical solutions. These methods are usually divided into two broad groups: stochastic (Monte Carlo) and deterministic. In Monte Carlo methods, the history of a finite number of particles is followed (i.e., simulated on a computer). In the case of the deterministic methods, approximate equations are derived from the transport equation, and the resulting system of algebraic equations is solved on a computer. Depending on the form of the neutron transport equation chosen as a starting point, the deterministic methods can be divided into three large groups:

those based on the integro-differential form,
those based on the surface-integral form, and
those based on the integral form of the neutron transport equation.

Since the collision/transfer probability (CTP) method is based on the integral form of the transport equation, several features of the integral transport methods will be pointed out. The main idea behind the integral transport methods is to integrate out the angular dependence and to solve the transport equation for the scalar neutron flux directly. This method is very accurate and relatively simple to apply, if isotropic scattering can be assumed.

The integral transport equation is based on a global neutron balance in a given direction, leading to a strong coupling of all regions; on the other hand, the integro-differential transport equation is based on a local neutron balance, leading to a coupling between the neighboring regions in space only. Although the treatment of the spatial variables in 2-D or 3-D in the integral transport equation leads to discretized matrices that are full (dense), integral transport methods can treat very complicated geometries, usually treated by Monte Carlo methods only. The strong spatial coupling and large, dense matrices, which put strong demands on computer memory and CPU time in the early years of applications of these methods, are not prohibitive for today's very fast supercomputers/workstations with large real/virtual memories.

In the following subsections, the general form of the multigroup discrete integral transport equations in 3D will be presented, and the definitions of various probabilities in neutron transport will be given. In order to reduce the number of collision, escape and transmission probabilities that need to be numerically calculated, the reciprocity and conservation relations will be derived. The general form of the 2D multigroup discrete integral transport equations will then be presented and the expressions for collision, escape and transmission probabilities will be derived for the case of isotropic neutron scattering and sources.

The Multigroup Discrete Integral Transport Equations in 3D

Figure 1:
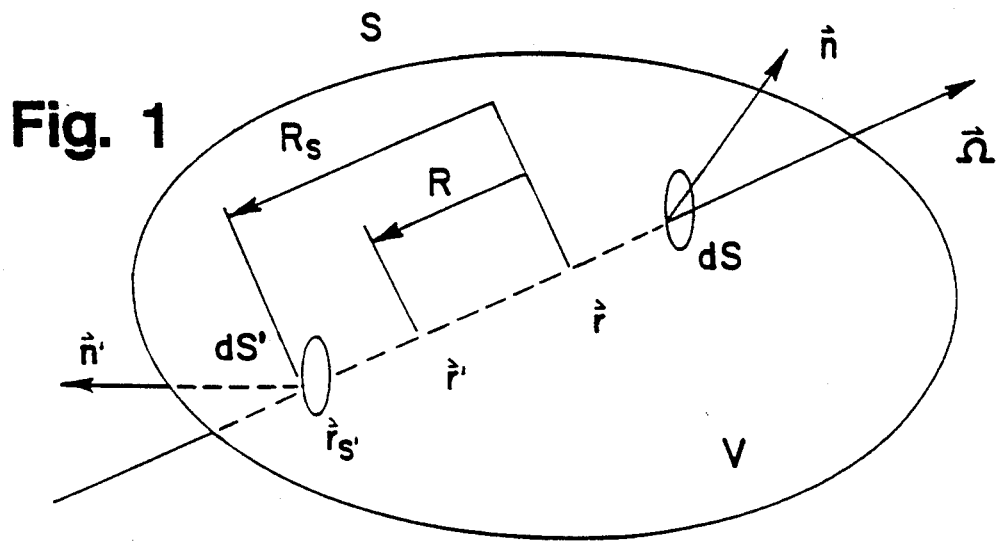
FIG. 1 illustrates the coordinates characterizing neutron transport in three-dimensions used in carrying out the present invention.

With assumptions of steady-state, zero external sources and a finite volume V bounded by a surface S (and with reference to FIG. 1, which shows the coordinates characterizing neutron transport in three-dimensions [3D]), the multigroup integral transport equation for the angular flux point at r in direction $\Omega$ can be expressed as $$\Phi_g(\vec{r},\vec{\Omega}) = \int_0^{R_S} dR Q_g(\vec{r} - R\vec{\Omega},\vec{\Omega})\exp[-\tau_g(\vec{r},\vec{r} - R\vec{\Omega})] + \quad (1)$$

$$\Phi_g(\vec{r} - R_S\vec{\Omega},\vec{\Omega})\exp[-\tau_g(\vec{r},\vec{r} - R_S\vec{\Omega})]$$

where
$g = 1, 2, \ldots, G$, $$Q_g(\vec{r},\vec{\Omega}) = \sum_{g'=1}^{G} S_{g' \to g}(\vec{r},\vec{\Omega}) + \frac{1}{k} X_g \sum_{g'=1}^{G} F_g{'}(\vec{r},\vec{\Omega}), \text{ is the volumetric source,}$$

$$\tau_g(\vec{r},\vec{r} - R\vec{\Omega}) = \int_R^0 dR' \Sigma_{t,g}(\vec{r} - R'\vec{\Omega}), \text{ is the optical length,}$$

and k is the effective multiplication factor. Equation (1) can be interpreted as follows: the neutron flux at r in direction $\Omega$ is a result of adding up all the uncollided source neutrons in volume V, produced on the trajectory ($r-R_s\Omega$,r) in direction $\Omega$, plus all uncollided neutrons entering the volume V through the surface S at $r_s = r-R_s\Omega$ in direction $\Omega$. The general isotropic fission source is given as $$F_g{'}(\vec{r},\vec{\Omega}) = \frac{1}{4\pi} \nu \Sigma_{f,g}(\vec{r}) \Phi_{g'}(\vec{r}),$$

and the scattering source as $$S_{g' \to g}(\vec{r},\vec{\Omega}) = \int_{4\pi} d\Omega' \Sigma_{s,g' \to g}(\vec{r},\mu_0) \Phi_{g'}(\vec{r},\vec{\Omega}'), \mu_0 = \vec{\Omega} \cdot \vec{\Omega}'$$

Generalized Peierls' Equation

For most applications in reactor physics, it is sufficient to know the mean value of the reaction rates in certain regions. It is therefore reasonable to derive the balance equations for the mean values directly from Eq.(1), rather than solving it first for the angular flux, and integrating afterwards. Thus, we will start by integrating Eq.(1) over $\Omega$ and substituting (using the notation defined in FIG. 1)

$$dRd\vec{\Omega} = \frac{d\vec{r}'}{|\vec{r}-\vec{r}'|^2}, d\Omega = \frac{dS'|\hat{n}' \cdot \hat{\Omega}|}{|\vec{r}-\vec{r}_S|^2},$$

to get $$\Phi_g(\vec{r}) = \int_V \frac{d\vec{r}'}{|\vec{r}-\vec{r}'|^2} Q_g(\vec{r}',\vec{\Omega})\exp[-\tau_g(\vec{r},\vec{r}')] + \quad (2)$$

$$+ \int_S \frac{dS'}{|\vec{r}-\vec{r}_S|^2} J_g^{in}(\vec{r}_S,\vec{\Omega})\exp[-\tau_g(\vec{r},\vec{r}_S)],$$

where $$\vec{r}' = \vec{r} - R\vec{\Omega}, \vec{r}_S = \vec{r} - R_S\vec{\Omega}, \vec{\Omega} = \frac{\vec{r}-\vec{r}'}{|\vec{r}-\vec{r}'|},$$

and $$J_g^{in}(\vec{r}_S,\vec{\Omega}) = |\hat{n}' \cdot \hat{\Omega}| \Phi_g(\vec{r}_S,\vec{\Omega}), \hat{n}' \cdot \hat{\Omega} < 0,$$

is the incoming angular current at $r_s$, on surface S, with $\hat{n}$, being the outward normal to surface S. In the case of either isotropic scattering or when linearly anisotropic scattering is approximated by transport corrected cross-sections, the scattering source depends on the scalar flux only, and Eq.(2) becomes a self-contained balance equation, the so called Peierls' equation. In the case of the general boundary conditions with incoming angular currents, an additional equation is needed for the partial currents of neutrons leaving the volume V, $$J_g^{out}(\vec{r}_S) = \int_V \frac{d\vec{r}'}{|(\vec{r}_S - \vec{r}')|^2} (\hat{n} \cdot \hat{\Omega}) Q_g(\vec{r}',\vec{\Omega})\exp[-\tau_g(\vec{r}_S,\vec{r}')] + \quad (3)$$

$$\int_S \frac{dS'}{|\vec{r}_S - \vec{r}_S'|^2} (\hat{n} \cdot \hat{\Omega}) J_g^{in}(\vec{r}_S',\vec{\Omega})\exp[-\tau_g(\vec{r}_S,\vec{r}_S')],$$

Three-Dimensional Collision Probability Formalism

It should be pointed out that so far no approximations have been introduced, and Eqs.(2) and (3) are exact. To obtain the mean reaction rates in regions of interest, the volume V and surface S are partitioned into $N_r$ subvolumes and $N_b$ subsurfaces, respectively, such that $$V = \sum_{i=1}^{N_r} V_i, S = \sum_{\alpha=1}^{N_b} S_\alpha.$$

Eq.(2) is then multiplied by $\Sigma_{t,g}(\vec{r})$ and integrated over $V_i$, whereas Eq.(3) is integrated over $S_\alpha$, giving $$V_i \Sigma_{t,g,i} \Phi_{g,i} = \quad (4)$$

$$\sum_{i'} V_{i'} Q_{g,i'} P_g(V_i \leftarrow V_{i'}) + \sum_{\alpha'} S_{\alpha'} J_{g,\alpha'}^{in} P_g(V_i \leftarrow S_{\alpha'}),$$

$$S_\alpha J_{g,\alpha}^{out} = \quad (5)$$

$$\sum_{i'} V_{i'} Q_{g,i'} P_g(S_\alpha \leftarrow V_{i'}) + \sum_{\alpha'} S_{\alpha'} J_{g,\alpha'}^{in} P_g(S_\alpha \leftarrow S_{\alpha'}),$$

where the spatially averaged quantities are defined as follows $$\Phi_{g,i} = \frac{1}{V_i} \int_{V_i} d\vec{r} \Phi_g(\vec{r})$$

$$\Phi_{g,i} = \frac{1}{V_i} \int_{V_i} d\vec{r} \int_{4\pi} d\vec{\Omega} Q_g(\vec{r},\vec{\Omega}),$$

$$\Sigma_{t,g,i} = \frac{1}{V_i \Phi_{g,i}} \int_{V_i} d\vec{r} \Sigma_{t,g}(\vec{r}) \Phi_g(\vec{r}),$$

$$J_{g,\alpha'}^{in} = \frac{1}{S_{\alpha'}} \int_{S_{\alpha'}} dS' \int_{\hat{n} \cdot \hat{\Omega} < 0} d\Omega J_g^{in}(\vec{r}_S,\vec{\Omega}),$$

-continued $$J_{g,a}^{out} = \frac{1}{S_a} \int_{S_a} dS \int_{\hat{n} \cdot \vec{\Omega} > 0} d\vec{\Omega} J_g^{out}(\vec{r},\vec{\Omega}),$$

The first flight collision probabilities, which are the probabilities that neutrons emitted in $V_i$ or neutrons which entered the system through $S_a$, will make their next collision in $V_i$, are defined as $$P(V_i \leftarrow V_{i'}) = \tag{6}$$

$$\frac{\int_{V_i} d\vec{r} \Sigma_{t,g}(\vec{r}) \int_{V_{i'}} \frac{d\vec{r}'}{|\vec{r} - \vec{r}'|^2} Q_g(\vec{r}',\vec{\Omega}) e^{-\tau_g(\vec{r},\vec{r}')}}{\int_{V_{i'}} d\vec{r}' \int_{4\pi} d\vec{\Omega} Q_g(\vec{r}',\vec{\Omega})},$$

$$P(V_i \leftarrow S_{a'}) = \tag{7}$$

$$\frac{\int_{V_i} d\vec{r} \Sigma_{t,g}(\vec{r}) \int_{S_{a'}} \frac{dS'}{|\vec{r} - \vec{r}_S|^2} J_g^{in}(\vec{r}_S,\vec{\Omega}) e^{-\tau_g(\vec{r},\vec{r}')}}{\int_{S_{a'}} dS' \int_{\hat{n}' \cdot \hat{\Omega} > 0} d\vec{\Omega} J_g^{in}(\vec{r}_S,\vec{\Omega})},$$

The escape probability, which is the probability that neutrons emitted in $V_i$ will escape through $S_a$ without making a collision, is given by $$P(S_a \leftarrow V_{i'}) = \frac{\int_{S_a} dS \int_{V_{i'}} \frac{d\vec{r}'(\hat{n} \cdot \vec{\Omega})}{|(\vec{r}_S - \vec{r}')|^2} Q_g(\vec{r}',\vec{\Omega}) e^{-\tau S(\vec{r}_s,\vec{r}')}}{\int_{V_{i'}} d\vec{r}' \int_{4\pi} d\vec{\Omega} Q_g(\vec{r}',\vec{\Omega})}, \tag{8}$$

Similarly, the transmission probability, which is the probability that neutrons entering through $S_a$, will leave the system through $S_a$ without making a collision is $$P_g(S_a \leftarrow S_{a'}) = \tag{9}$$

$$\frac{\int_{S_a} dS \int_{S_{a'}} \frac{dS'(\hat{n} \cdot \vec{\Omega})}{|\vec{r}_S - \vec{r}_S'|^2} J_g^{in}(\vec{r}_S,\vec{\Omega}) e^{-\tau_g(\vec{r}_s,\vec{r}_s')}}{\int_{S_{a'}} dS' \int_{\hat{n} \cdot \hat{\Omega} < 0} d\vec{\Omega} J_g^{in}(\vec{r}_S,\vec{\Omega})},$$

Equations (6)–(9) are general definitions of the collision, escape and transmission probabilities.

General Reciprocity and Conservation Relations

General properties of the solution of the linear transport equation will now be employed to reduce the number of the collision, escape, and transmission probabilities that need to be calculated numerically. Although the general reciprocity relation and two well-known relations among the probabilities will be derived here, it will be shown later that the reciprocity relations for uncollided (first-flight) probabilities are a consequence of the symmetry of the kernel $$\frac{e^{-\tau_g(\vec{r}',\vec{r})}}{|\vec{r}' - \vec{r}|^2} = \frac{e^{-\tau S(\vec{r},\vec{r}')}}{|\vec{r} - \vec{r}'|^2}.$$

General Reciprocity Relation

The steady-state neutron transport equation is given by $$\vec{\Omega} \cdot \nabla \Phi(\vec{r},\vec{\Omega}) + \Sigma_t(\vec{r}) \Phi(\vec{r},\vec{\Omega}) = Q(\vec{r},\vec{\Omega}). \tag{10}$$

Two cases are considered: in Case 1, the angular flux distribution $\Phi_1(\vec{r},\vec{\Omega})$ is due to a volumetric source $Q_1(\vec{r},\vec{\Omega})$ and an incoming flux $\Phi_1^{in}(\vec{r},\vec{\Omega})$, and in Case 2, the angular flux distribution $\Phi_2(\vec{r},\vec{\Omega})$ is due to a volumetric source $Q_2(\vec{r},\vec{\Omega})$ and an incoming flux $\Phi_2^{in}(\vec{r},\vec{\Omega})$, i.e.

$$\vec{\Omega} \cdot \nabla \Phi_1(\vec{r},\vec{\Omega}) + \Sigma_t(\vec{r}) \Phi_1(\vec{r},\vec{\Omega}) = Q_1(\vec{r},\vec{\Omega}), \tag{11}$$
$$\Phi_1(\vec{r}_S,\vec{\Omega}) = \Phi_1^{in}(\vec{r}_S,\vec{\Omega}), \hat{n} \cdot \vec{\Omega} < 0, \vec{r}_S \in S,$$

and $$-\vec{\Omega} \cdot \nabla \Phi_2(\vec{r},-\vec{\Omega}) + \Sigma_t(\vec{r}) \Phi_2(\vec{r},-\vec{\Omega}) = Q_2(\vec{r},-\vec{\Omega}), \tag{12}$$
$$\Phi_2(\vec{r}_S,-\vec{\Omega}) = \Phi_{in}(\vec{r}_S,-\vec{\Omega}), \hat{n} \cdot \vec{\Omega} > 0, \vec{r}_S \in S,$$

where Eq.(12) is written for $-\vec{\Omega}$. Equation (11) is now multiplied by $\Phi_2(\vec{r},-\vec{\Omega})$, Eq.(12) by $\Phi_1(\vec{r},\vec{\Omega})$, and they are subtracted. The result is then integrated over all angles and over the volume V. Combining the two gradient terms into one and using the divergence theorem, one can obtain $$\int_S dS \int_{4\pi} d\vec{\Omega} \hat{n} \cdot \vec{\Omega} \Phi_2(\vec{r},-\vec{\Omega}) \Phi_1(\vec{r},\vec{\Omega}) = \tag{13}$$

$$\int_V dV \int_{4\pi} d\vec{\Omega} [\Phi_2(\vec{r},-\vec{\Omega}) Q_1(\vec{r},\vec{\Omega}) - \Phi_1(\vec{r},\vec{\Omega}) Q_2(\vec{r},-\vec{\Omega})]$$

The angular integration on the left-hand side of Eq.(13) can be divided into two parts, for $\hat{n} \cdot \vec{\Omega} > 0$ and $\hat{n} \cdot \vec{\Omega} < 0$, giving the general form of the reciprocity relation:

$$\int_S dS \int_{\hat{n} \cdot \hat{\Omega} < 0} d\vec{\Omega} |\hat{n} \cdot \hat{\Omega}| [\Phi_1(\vec{r},-\vec{\Omega}) \Phi_2^{in}(\vec{r},\vec{\Omega}) - \tag{14}$$

$$\Phi_1^{in}(\vec{r},\vec{\Omega}) \Phi_2(\vec{r},-\vec{\Omega})] =$$

$$\int_V dV \int_{4\pi} d\vec{\Omega} [\Phi_2(\vec{r},-\vec{\Omega}) Q_1(\vec{r},\vec{\Omega}) - \Phi_1(\vec{r},\vec{\Omega}) Q_2(\vec{r},-\vec{\Omega})]$$

Reciprocity Relation for Collision Probabilities

Suppose that in Case 1 there is a uniform and isotropic source in $V_1$, emitting 1 neutron/second, and there is no incoming neutron flux. Then, $$\int_{V_1} dV \int_{4\pi} d\vec{\Omega} Q_1(\vec{r},\vec{\Omega}) = 1 \rightarrow Q_1(\vec{r},\vec{\Omega}) = \begin{cases} \frac{1}{4\pi V_1}, & \vec{r} \in V_1 \\ 0, & \text{otherwise.} \end{cases}$$

In Case 2 there is a uniform and isotropic source in $V_2$, emitting 1 neutron/second, and no incoming neutron flux, i.e.

$$\int_{V_2} dV \int_{4\pi} d\vec{\Omega} Q_2(\vec{r},\vec{\Omega}) = 1 \rightarrow Q_2(\vec{r},\vec{\Omega}) = \begin{cases} \frac{1}{4\pi V_2}, & \vec{r} \in V_2 \\ 0, & \text{otherwise.} \end{cases}$$

With sources defined this way, Eq.(14) becomes $$\frac{1}{V_1} \int_{V_1} dV \Phi_2(\vec{r}) = \frac{1}{V_2} \int_{V_2} dV \Phi_1(\vec{r}). \quad (15)$$

The collision probability that neutrons emitted uniformly and isotropically in $V_1$ will make their next collision in $V_2$ can be calculated by substituting the value for $Q_1(\vec{r},\vec{\Omega})$ into Eq.(6):

$$P(V_2 \leftarrow V_1) = \quad (16)$$

$$\int_{V_2} d\vec{r} \Sigma_t(\vec{r}) \int_{V_1} \frac{d\vec{r}'}{4\pi V_1 |\vec{r} - \vec{r}'|^2} e^{-\tau(\vec{r},\vec{r}')} = \Sigma_{t,2} \int_{V_2} dV \Phi_1(\vec{r}),$$

where we assumed that the total cross-section is constant over $V_2$. A similar expression can be obtained for the collision probability that neutrons emitted uniformly and isotropically in $V_2$ will make their next collision in $V_1$, $$P(V_1 \leftarrow V_2) = \quad (17)$$

$$\int_{V_1} d\vec{r} \Sigma_t(\vec{r}) \int_{V_2} \frac{d\vec{r}'}{4\pi V_2 |\vec{r} - \vec{r}'|^2} e^{-\tau(\vec{r},\vec{r}')} =$$

$$\Sigma_{t,1} \int_{V_1} dV \Phi_2(\vec{r}),$$

where we assumed that the total cross-section is constant over $V_1$. By combining Eqs.(15)–(17), the well-known reciprocity relation for collision probabilities is obtained $$V_2 \Sigma_{t,2} P(V_1 \leftarrow V_2) = V_1 \Sigma_{t,1} P(V_2 \leftarrow V_1). \quad (18)$$

Reciprocity Relation for Collision and Escape Probabilities

Suppose that Case 1 remains the same; for Case 2 it is assumed that all volumetric sources are zero, and that there is a uniform and isotropic incoming flux on surface $S_2$ of magnitude 1 neutron/second, i.e.

$$\int_{S_2} dS \int_{\hat{n} \cdot \hat{\Omega} < 0} d\vec{\Omega} |\hat{n} \cdot \hat{\Omega}| \Phi_2^{in}(\vec{r},\vec{\Omega}) = 1 \rightarrow$$

$$\Phi_2^{in}(\vec{r},\vec{\Omega}) = \begin{cases} \frac{1}{\pi S_2}, & \vec{r} \in S_2 \\ 0, & \text{otherwise} \end{cases}$$

Substituting the neutron sources for Case 1 and Case 2 into Eq.(14), one obtains $$\frac{1}{S_2 \pi} \int_{S_2} dS \int_{\hat{n} \cdot \hat{\Omega} > 0} d\vec{\Omega} (\hat{n} \cdot \hat{\Omega}) \Phi_1(\vec{r},\vec{\Omega}) = \quad (19)$$

$$\frac{1}{4\pi V_1} \int_{V_1} dV \Phi_2(\vec{r}).$$

The collision probability that neutrons entering through $S_2$ uniformly and isotropically will make their next collision in $V_1$ can be calculated by substituting the incoming flux from Case 2 into Eq.(7):

$$P(V_1 \leftarrow S_2) = \quad (20)$$

$$\int_{V_1} d\vec{r} \Sigma_t(\vec{r}) \int_{S_2} \frac{dS'}{\pi S_2 |\vec{r} - \vec{r}_S'|^2} e^{-\tau(\vec{r},\vec{r}_S)} = \Sigma_{t,1} \int_{V_1} dV \Phi_2(\vec{r}),$$

where we assumed that the total cross-section is constant over $V_1$. The escape probability that neutrons emitted uniformly and isotropically in $V_1$ will escape through $S_2$ can be calculated by substituting the volumetric source from Case 1 into Eq.(8):

$$P(S_2 \leftarrow V_1) = \quad (21)$$

$$\int_{S_2} dS \int_{V_1} \frac{d\vec{r}(\hat{n} \cdot \hat{\Omega})}{4\pi V_1 |\vec{r}_S - \vec{r}|^2} e^{-\tau(\vec{r}_S,\vec{r})} = \int_{S_2} dS J_1^{out}(\vec{r}).$$

By combining Eqs.(19)–(21), the well-known surface reciprocity relation is obtained $$P(V_1 \leftarrow S_2) = \frac{4 V_1 \Sigma_{t,1}}{S_2} P(S_2 \leftarrow V_1). \quad (22)$$

Reciprocity Relation for Transmission Probabilities

For both cases we assume that all volumetric sources are zero, and that there is a uniform and isotropic incoming flux on surface $S_1$ in Case 1 and on surface $S_2$ in Case 2, both of strength 1 neutron/second, i.e.

$$\int_{S_\alpha} dS \int_{\hat{n} \cdot \hat{\Omega} < 0} d\vec{\Omega} |\hat{n} \cdot \hat{\Omega}| \Phi_\alpha^{in}(\vec{r},\vec{\Omega}) = 1 \rightarrow$$

$$\Phi_\alpha^{in}(\vec{r},\vec{\Omega}) = \begin{cases} \frac{1}{\pi S_\alpha}, & \vec{r} \in S_\alpha \\ 0, & \text{otherwise} \end{cases}$$

where $\alpha = 1, 2$. With the sources defined this way, Eq.(14) becomes $$\frac{1}{S_2 \pi} \int_{S_2} dS \int_{\hat{n} \cdot \hat{\Omega} > 0} d\vec{\Omega} (\hat{n} \cdot \hat{\Omega}) \Phi_1(\vec{r},\vec{\Omega}) = \quad (23)$$

$$\frac{1}{S_1 \pi} \int_{S_1} dS \int_{\hat{n} \cdot \hat{\Omega} < 0} d\vec{\Omega} (\hat{n} \cdot \hat{\Omega}) \Phi_2(\vec{r},\vec{\Omega})$$

Using Eq.(9) we obtain $$S_1 P(S_2 \leftarrow S_1) = S_2 P(S_1 \leftarrow S_2) \quad (24)$$

General Conservation Relation

The uncollided angular flux, $\Phi_u(\vec{r},\vec{\Omega})$, satisfies the following equation, obtained from Eq.(10)

$$\vec{\Omega} \cdot \nabla \Phi_u(\vec{r},\vec{\Omega}) + \Sigma_t(\vec{r}) \Phi_u(\vec{r},\vec{\Omega}) = q(\vec{r},\vec{\Omega}), \quad (25)$$

where $q(\vec{r},\vec{\Omega})$ is the volumetric angular source which does not contain the scattering source any more. Integrating Eq.(25) over $\Omega$ and $V$, and applying the divergence theorem one obtains $$\int_S dS J_u^{out}(\vec{r}) + \int_V dV \Sigma_t(\vec{r}) \Phi_u(\vec{r}) = \quad (26)$$

$$\int_V dV \int_{4\pi} d\vec{\Omega} q(\vec{r},\vec{\Omega}) + \int_S dS J^{in}(\vec{r})$$

where $$J_u^{out}(\vec{r}) = \int_{\hat{n}\cdot\hat{\Omega}>0} d\Omega(\hat{n}\cdot\hat{\Omega})\Phi_u(\vec{r},\vec{\Omega})$$

is the uncollided outgoing scalar current, and $$J^{in}(\vec{r}) = \int_{\hat{n}\cdot\hat{\Omega}<0} d\vec{\Omega}|\hat{n}\cdot\hat{\Omega}|\Phi_u(\vec{r},\vec{\Omega})$$

is the surface source (or the incoming scalar current). Using the definitions of the spatially averaged quantities from Eqs.(4) and (5), Eq.(26) becomes $$\sum_\alpha S_\alpha J_\alpha^{out} + \sum_i V_i \Sigma_{t,i} \Phi_i = \int_V dV \int_{4\pi} d\vec{\Omega} q(\vec{r},\vec{\Omega}) + \int_S dS J^{in}(\vec{r}) \quad (27)$$

which is still formally exact. Knowing that Eq.(27) has to be satisfied for arbitrary sources, we can define the following two cases: Case 1, with a uniform and isotropic source in volume $V_{i'}$ emitting 1 neutron/second, and with zero incoming current, i.e.

$$\int_{V_{i'}} dV \int_{4\pi} d\vec{\Omega} q(\vec{r},\vec{\Omega}) = 1 \to q(\vec{r},\vec{\Omega}) = \begin{cases} \frac{1}{4\pi V_{i'}}, & \vec{r}\epsilon V_{i'} \\ 0, \text{ otherwise.} \end{cases}$$

$$J^{in}(\vec{r}) = 0, \vec{r}\epsilon S.$$

and Case 2, with a uniform and isotropic incoming flux on surface $S_{\alpha'}$ of magnitude 1 neutron/second, and zero volumetric sources, i.e.

$$\int_{S_{\alpha'}} dS J^{in}(\vec{r}) = 1 \to J^{in}(\vec{r}) = \begin{cases} \frac{1}{S_{\alpha'}}, & \vec{r}\epsilon S_{\alpha'} \\ 0, \text{ otherwise} \end{cases}$$

$$q(\vec{r},\vec{\Omega}) = 0, \vec{r}\epsilon V.$$

The first conservations relation can be obtained by substituting the volumetric and surface source from Case 1 into Eq.(27):

$$\sum_\alpha S_\alpha J_\alpha^{out} + \sum_i V_i \Sigma_{t,i} \Phi_i = 1. \quad (28)$$

For Case 1, Eqs.(4) nd (5) will have the following form $$V_i \Sigma_{t,g,i} \Phi_{g,i} = P_g(V_i \leftarrow V_{i'}),$$
$$S_\alpha J_{g,\alpha}^{out} = P_g(S_\alpha \leftarrow V_{i'})$$

which when substituted into Eq.(28) gives $$\sum_\alpha P_g(S_\alpha \leftarrow V_{i'}) + \sum_i P_g(V_i \leftarrow V_{i'}) = 1. \quad (29)$$

This conservation theorem relates the volume-to-volume collision probabilities with the escape probabilities. To obtain the second conservation relation we use the same procedure, but for the sources defined in Case 2, i.e.

$$V_i \Sigma_{t,g,i} \Phi_{g,i} = P(V_i \leftarrow S_{\alpha'})$$
$$S_\alpha J_{g,\alpha}^{out} = P_g(S_\alpha \leftarrow S_{\alpha'})$$

which when substituted into Eq.(28) gives $$\sum_\alpha P_g(S_\alpha \leftarrow S_{\alpha'}) + \sum_i P(V_i \leftarrow S_{\alpha'}) = 1. \quad (30)$$

This conservation theorem relates the surface-to-volume collision probabilities with the transmission probabilities.

Two-Dimensional Collision/Transfer Probability Formalism

To obtain the integral equations for two-dimensional geometries, we assume that the volume V is an infinitely long cylinder (FIG. 2), homogeneous in the z-direction, such that the sources, partial currents and scalar flux are independent of z. Therefore, these quantities can be replaced by their values in the x-y plane, i.e.

$$Q_g(\vec{r} - \bar{R}\vec{\Omega},\vec{\Omega}) = Q_g(\vec{r} - R\hat{\Omega}_{xy},\vec{\Omega})$$
$$\Phi_g(\vec{r} - \bar{R}\vec{\Omega},\vec{\Omega}) = \Phi_g(\vec{r} - R\hat{\Omega}_{xy},\vec{\Omega})$$

where $\hat{\Omega}_{xy}$ is a unit vector in the direction of the projection of $\Omega$ on the x-y plane, and $R = R\sin\Theta$. Similarly, the projection of the optical length on the x-y plane is $$t_g(\vec{r}-R\hat{\Omega}_{xy},\vec{\Omega})=t_g(\vec{r}-\bar{R}\vec{\Omega},\vec{\Omega})\sin\theta,$$

where $\theta$ is the polar angle. With these changes Eq.(1) become $$\Phi_g(\vec{r},\vec{\Omega}) = \quad (31)$$

$$\int_0^{R_{L'}} \frac{dR}{\sin\theta} Q_g(\vec{r} - R\hat{\Omega}_{xy},\vec{\Omega})\exp\frac{[-\tau_g(\vec{r},\vec{r}' - R\hat{\Omega}_{xy})]}{\sin\theta} +$$

$$\Phi_g(\vec{r} - R_L\hat{\Omega}_{xy},\vec{\Omega})\exp\frac{[-\tau_g(\vec{r},\vec{r}' - R_L\hat{\Omega}_{xy})]}{\sin\theta}$$

The scaler flux is obtained from Eq.(31) by integrating over $\Omega$. Using notation from FIG. 2, which illustrates the coordinates characterizing neutron transport in two-dimensional geometry, one obtains $$\Phi_g(\vec{r}) = \int_A d\frac{A}{|\vec{r}-\vec{r}'|} \int_0^\pi d\theta Q_g(r',\vec{\Omega})\exp\frac{[-\tau_g(\vec{r},\vec{r}')]}{\sin\theta} +$$

$$\int_L \frac{dL'}{|\vec{r}-\vec{r}_{L'}|} \int_0^\pi d\theta\sin\theta J_g^{in}(\vec{r}_{L'},\vec{\Omega})\exp\frac{[-\tau_g(\vec{r},\vec{r}_{L'})]}{\sin\theta}$$

where $$dRd\phi = \frac{dA'}{R} = \frac{dA'}{|\vec{r}-\vec{r}'|},$$

$$d\phi = \frac{dL'|\hat{n}\cdot\Omega_{xy}|}{R_{L'}} = \frac{dL'|\hat{n}\cdot\hat{\Omega}_{xy}|}{|\vec{r}-\vec{r}_{L'}|}$$

$$\vec{r}' = \vec{r} - R\hat{\Omega}_{xy}, \vec{r}_{L'} = \vec{r} - R_L\hat{\Omega}_{xy}$$

-continued
$$\hat{\Omega}_{xy} = \frac{\vec{r} - \vec{r'}}{|\vec{r} - \vec{r'}|} = \frac{\vec{r} - \vec{r}_{L'}}{|\vec{r} - \vec{r}_{L'}|}$$

$$J_g^{out}(\vec{r}_L) = \int_A \frac{dA(\hat{n}\cdot\hat{\Omega}_{xy})}{|\vec{r}_L - \vec{r'}|} \int_0^\pi d\theta \sin\theta Q_g(\vec{r'},\vec{\Omega})\exp\frac{[-\tau_g(\vec{r}_L,\vec{r'})]}{\sin\theta} +$$

$$\int_L \frac{dL'(\hat{n}\cdot\hat{\Omega}_{xy})}{|\vec{r}_L - \vec{r}_{L'}|} \int_0^\pi d\theta\,(\sin\theta)^2 \cdot J_g^{in}(\vec{r}_{L'},\vec{\Omega})\exp\frac{[-\tau_g(\vec{r}_L,\vec{r}_{L'})]}{\sin\theta}$$

where $$\vec{r'} = \vec{r}_L - R\hat{\Omega}_{xy},\ \vec{r}_{L'} = \vec{r}_L - R_{L'}\hat{\Omega}_{xy},$$

$$\hat{\Omega}_{xy} = \frac{\vec{r}_L - \vec{r'}}{|\vec{r}_L - \vec{r'}|} = \frac{\vec{r}_L - \vec{r}_{L'}}{|\vec{r}_L - \vec{r}_{L'}|}$$

and $\hat{n}\epsilon(x - y)$plane.

To obtain the discretized integral transport equations for two-dimensional geometry, the same formalism can be applied as in the three-dimensional case. The area A and boundary L are partitioned into $N_r$ subareas and $N_b$ sub-boundaries, respectively, such that $$A = \sum_{i=1}^{N_r} A_i,\ L = \sum_{\alpha=1}^{N_b} L_\alpha$$

Eq.(32) is then multiplied by $\Sigma_{t,g}(r)$ and integrated over $A_i$, whereas Eq.(33)k is integrated over $L_\alpha$, giving $$A_i\Sigma_{t,g,i}\Phi_{g,i} = \sum_{i'} A_{i'}Q_{g,i'}P_g(A_i \leftarrow A_{i'}) + \sum_{\alpha'} L_{\alpha'}J_{g,\alpha'}^{in}P_g(A_i \leftarrow L_{\alpha'}) \quad (34)$$

$$L_\alpha J_{g,\alpha}^{out} = \sum_{i'} A_{i'}Q_{g,i'}P_g(L_\alpha \leftarrow A_{i'}) + \sum_{\alpha'} L_{\alpha'}J_{g,\alpha'}^{in}P_g(L_\alpha \leftarrow L_{\alpha'}) \quad (35)$$

where the spatially averaged quantities are defined as follows $$\Phi_{g,i} = \frac{1}{A_i}\int_{A_i} dA'\Phi_g(\vec{r})$$

$$Q_{g,i'} = \frac{1}{A_{i'}}\int_{A_{i'}} dA' \int_{4\pi} d\vec{\Omega} Q_g(\vec{r'},\vec{\Omega}),$$

$$\Sigma_{t,g,i} = \frac{1}{A_i\Phi_{g,i}}\int_{A_i} dA\Sigma_{t,g}(\vec{r})\Phi_g(\vec{r})$$

$$J_{g,\alpha'}^{in} = \frac{1}{L_{\alpha'}}\int_{\alpha'} dL' \int_{\hat{n}\cdot\vec{\Omega} < 0} d\vec{\Omega} J_g^{in}(\vec{r}_{L'},\vec{\Omega}),$$

$$J_{g,\alpha}^{out} = \frac{1}{L_\alpha}\int_{L_\alpha} dL \int_{\hat{n}\cdot\vec{\Omega} > 0} d\vec{\Omega} J_g^{out}(\vec{r}_L,\vec{\Omega})$$

The first flight collision probabilities that neutrons emitted in $A_{i'}$ or neutrons that entered the system through $L_{\alpha'}$ will make their next collision in $A_i$ are defined as $$P_g(A_i \leftarrow A_{i'}) = \frac{\int_{A_i} dA\Sigma_{t,g}(\vec{r}) \int_{A_{i'}} \frac{dA'}{|\vec{r} - \vec{r'}|} \int_0^\pi d\theta Q_g(\vec{r'},\vec{\Omega})\exp\frac{[-\tau_g(\vec{r},\vec{r'})]}{\sin\theta}}{\int_{A_{i'}} dA' \int_{4\pi} d\vec{\Omega} Q_g(\vec{r'},\vec{\Omega})} \quad (36)$$

$$P_g(A_i \leftarrow L_{\alpha'}) = \frac{\int_{A_i} dA\Sigma_{t,g}(\vec{r}) \int_{L_{\alpha'}} \frac{dL'}{|\vec{r} - \vec{r}_{L'}|} \int_0^\pi d\theta \sin\theta J_g^{in}(\vec{r}_{L'},\vec{\Omega})\exp\frac{[-\tau_g(\vec{r},\vec{r}_{L'})]}{\sin\theta}}{\int_{L_{\alpha'}} dL' \int_{\hat{n}\cdot\vec{\Omega} < 0} d\vec{\Omega} J_g^{in}(\vec{r}_{L'},\vec{\Omega})} \quad (37)$$

Similarly, the escape probability that neutrons emitted in $A_{i'}$ will escape through $L_\alpha$ without making a collision is given by $$P_g(L_\alpha \leftarrow A_{i'}) = \frac{\int_{L_\alpha} dL \int_A \frac{dA(\hat{n}\cdot\hat{\Omega}_{xy})}{|\vec{r}_L - \vec{r'}|} \int_0^\pi d\theta \sin\theta Q_g(\vec{r'},\vec{\Omega})\exp\frac{[-\tau_g(\vec{r}_L,\vec{r'})]}{\sin\theta}}{\int_{A_{i'}} dA' \int_{4\pi} d\Omega Q_g(\vec{r'},\vec{\Omega})} \quad (38)$$

and the transmission probability that neutrons entering through $L_{\alpha'}$ will leave the system through $L_\alpha$ without making a collision is $$P_g(L_\alpha \leftarrow L_{\alpha'}) = \frac{\int_{L_\alpha} dL \int_{L_{\alpha'}} \frac{dL'(\hat{n}\cdot\hat{\Omega}_{xy})}{|\vec{r}_L - \vec{r}_{L'}|} \int_0^\pi d\theta(\sin\theta)^2 \cdot J_g^{in}(\vec{r}_{L'},\vec{\Omega})\exp\frac{[-\tau_g(\vec{r}_L,\vec{r}_{L'})]}{\sin\theta}}{\int_{L_{\alpha'}} dL' \int_{\hat{n}\cdot\vec{\Omega} < 0} d\Omega J_g^{in}(\vec{r}_{L'},\vec{\Omega})} \quad (39)$$

Equations (36)–(39) provide general definitions of the collision, escape and transmission probabilities for two-dimensional geometry.

In order to solve the system of eigenvalue equations (Eqs.[34]–[35]), one more equation is needed to relate the incoming and outgoing currents. This equation can be obtained from the boundary conditions, which can be expressed in general form as follows $$J_{g,\alpha}^{in} = J_{g,\alpha}^0 + \beta_{g\rightarrow g,\alpha}J_{g,\alpha}^{out} + \sum_{g'\neq g}\beta_{g'\rightarrow g,\alpha}J_{g',\alpha}^{out} \quad (40)$$

Isotropic Scattering and Isotropic Incoming Flux

In the case of isotropic scattering and isotropic incoming flux, we have $$Q_g(\vec{r},\vec{\Omega}) = \frac{Q(\vec{r})}{4\pi},$$

$$J_g^{in}(\hat{r}_L,\vec{\Omega}) = |\hat{n}\cdot\hat{\Omega}|\frac{\Phi_g(\hat{r}_L)}{4\pi} = |\hat{n}\cdot\hat{\Omega}|\frac{J_g^{in}(\hat{r}_L)}{\pi}.$$

Assuming that the total cross-section is constant over the particular region, and using the flat-source approximation, we can write $$\Sigma_{t,g,i} = \Sigma_{t,g}(\vec{r}), \; Q_g(\vec{r}) \approx Q_{g,i}, \text{ for } \vec{r} \in A_i$$

and $$J_g^{in}(\hat{r}_L) \approx J_{g,\alpha'}^{in}, \text{ for } \hat{r}_{L'} \in L_{\alpha'}.$$

With these assumptions, Eqs.(36)–(39) become $$P_g(A_i \leftarrow A_{i'}) = \frac{\Sigma_{t,g,i}}{A_{i'}} \int_{A_i} dA \int_{A_{i'}} \frac{dA'}{2\pi|\vec{r}-\vec{r}'|} Ki_1[\tau_g(\vec{r},\vec{r}')] \quad (41)$$

$$P_g(A_i \leftarrow L_{\alpha'}) = \quad (42)$$

$$\frac{4\Sigma_{t,g,i}}{L_{\alpha'}} \int_{A_i} dA \int_{L_{\alpha'}} \frac{dL'|\hat{n}'\cdot\hat{\Omega}_{xy}|}{2\pi|\vec{r}-\vec{r}_{L'}|} Ki_2[\tau_g(\vec{r},\vec{r}_{L'})] \quad$$

$$P_g(L_\alpha \leftarrow A_{i'}) = \frac{1}{A_{i'}} \int_{L_\alpha} dL \int_{A_{i'}} \frac{dA'(\hat{n}\cdot\hat{\Omega}_{xy})}{2\pi|\vec{r}_L-\vec{r}'|} (Ki_2[\tau_g(r_L,r')]) \quad (43)$$

$$P_g(L_\alpha \leftarrow L_{\alpha'}) = \quad (44)$$

$$\frac{4}{L_{\alpha'}} \int_{L_\alpha} dL \int_{L_{\alpha'}} \frac{dL'(\hat{n}\cdot\hat{\Omega}_{xy})|\hat{n}'\cdot\hat{\Omega}_{xy}|}{2\pi|\vec{r}_L-\vec{r}_{L'}|} (Ki_3[\tau_g(\vec{r}_L,\vec{r}_{L'})])$$

where $$Ki_n(\tau) = \int_0^{\pi/2} d\theta(\sin\theta)^{n-1}\exp\left(-\frac{\tau}{\sin\theta}\right)$$

is the Bickley-Nayler function. In this case $P_g(A_i \leftarrow A_{i'})$ is the first flight volume-to-volume collision probability that neutrons emitted uniformly and isotropically in $A_{i'}$ will have their next collision in $A_i$; whereas $P_g(A_i \leftarrow L_{\alpha'})$ is the first flight surface-to-volume collision probability that neutrons entering through $L_{\alpha'}$ uniformly and isotropically will have their next collision in $A_i$. Similarly, $P_g(L_\alpha \leftarrow A_{i'})$ is the first flight escape probability that neutrons emitted uniformly and isotropically in $A_{i'}$ will escape through $L_\alpha$ without having a collision, and $P_g(L_\alpha \leftarrow L_{\alpha'})$ is the transmission probability that neutrons entering through $L_{\alpha'}$ uniformly and isotropically will escape through $L_\alpha$ without having a collision.

Reciprocity and Conservation Relations in 2D

The reciprocity relations in 2D can be derived from the general reciprocity relations in 3D, or more easily from Eqs.(41)–(44), by reversing the direction of $\Omega$ and using the optical length symmetry, to get:

$$A_{i'}\Sigma_{t,g,i'}P_g(A_i \leftarrow A_{i'}) = A_i\Sigma_{t,g,i}P_g(A_{i'} \leftarrow A_i), \quad (45)$$

$$\frac{L_\alpha}{4} P_g(A_{i'} \leftarrow L_\alpha) = A_{i'}\Sigma_{t,g,i'}P_g(L_\alpha \leftarrow A_{i'}), \quad (46)$$

and

-continued
$$L_{\alpha'}P_g(L_\alpha \leftarrow L_{\alpha'}) = L_\alpha P_g(L_{\alpha'} \leftarrow L_\alpha). \quad (47)$$

For two dimensional geometry the conservation relations, Eqs.(29) and (30), take the form $$\sum_\alpha P_g(L_\alpha \leftarrow A_{i'}) = 1 - \sum_i P_g(A_i \leftarrow A_{i'}), \quad (48)$$

and $$\sum_\alpha P_g(L_\alpha \leftarrow L_{\alpha'}) = 1 - \sum_i P_g(A_i \leftarrow L_{\alpha'}), \quad (49)$$

Numerical Calculation of Collision/Transfer Probability Matrices

The most time-consuming part of the entire collision/transfer probability formalism is the evaluation of the coefficients of the collision, escape and transmission probability matrices. The calculation time increases rapidly with the increase in the number of energy and space meshes. The usefulness of the collision probability method is closely related to the efficiency with which the collision, escape and transmission probability matrices are numerically calculated.

The form in which the probabilities are presented in Eqs.(41)–(44) is not suited for numerical integration. The number of integrations that must be carried out is five for Eq.(41), four for Eqs.(42) and (43) and three for Eq.(44). The best way to integrated those expressions is to follow the neutron trajectories, in which case some integrals can be carried out analytically.

Figure 2:
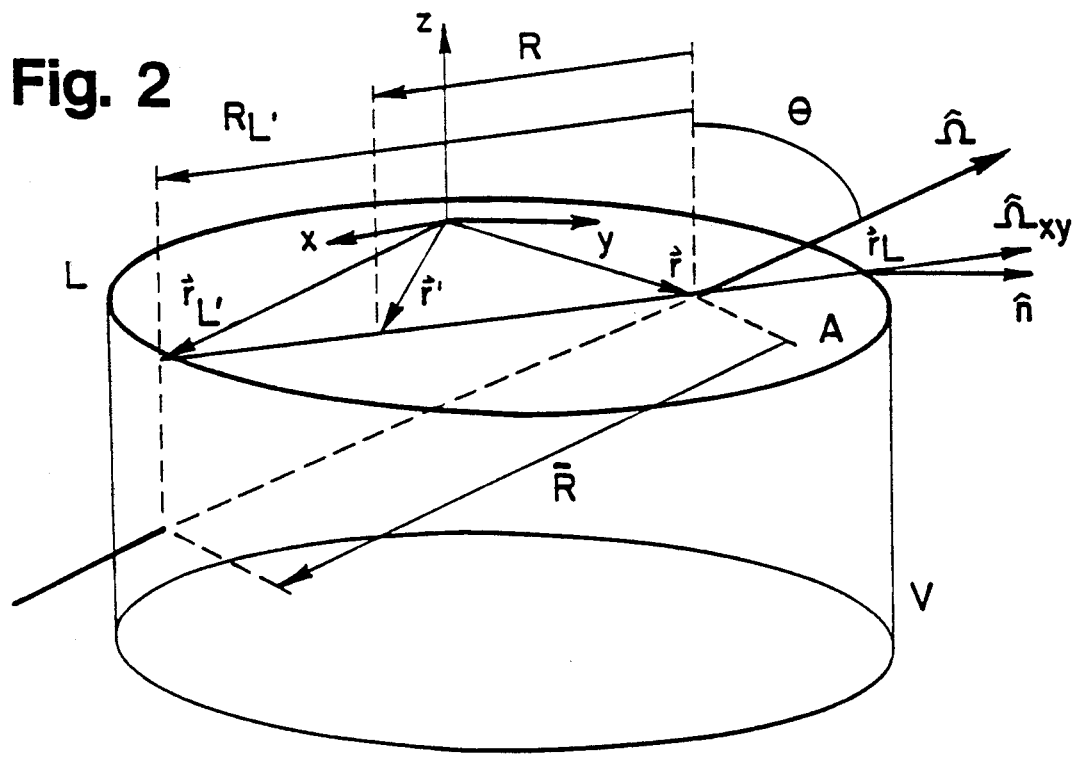
FIG. 2 illustrates the coordinates characterizing neutron transport in two-dimensional geometry as employed in carrying out the present invention.
Figure 3A:
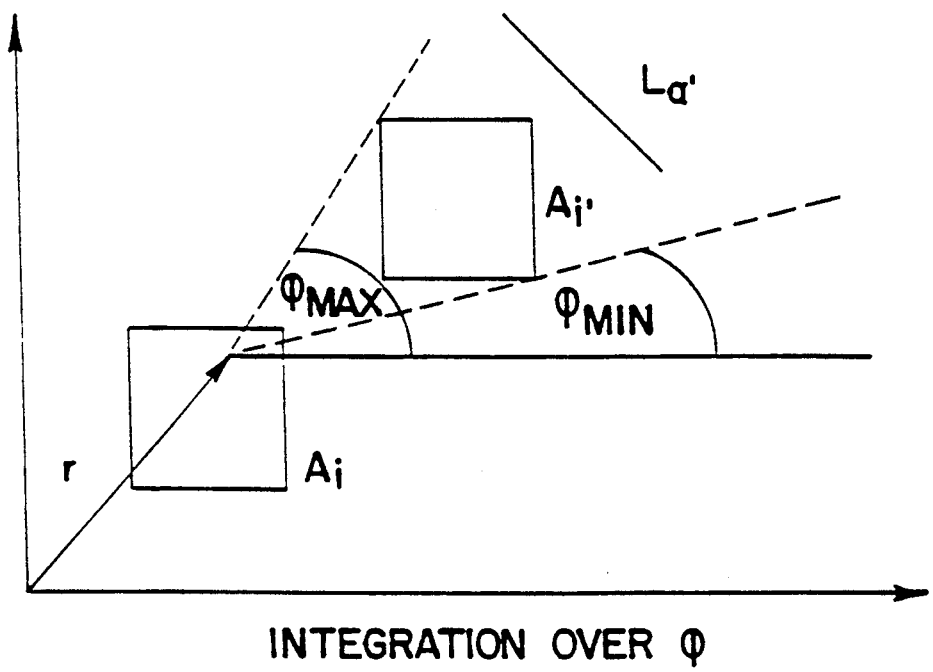
FIGS. 3a and 3b illustrate the coordinates used in the calculation of the volume-to-volume collision probabilities of neutrons integrated over $\Phi$ and over R, respectively.
Figure 3B:
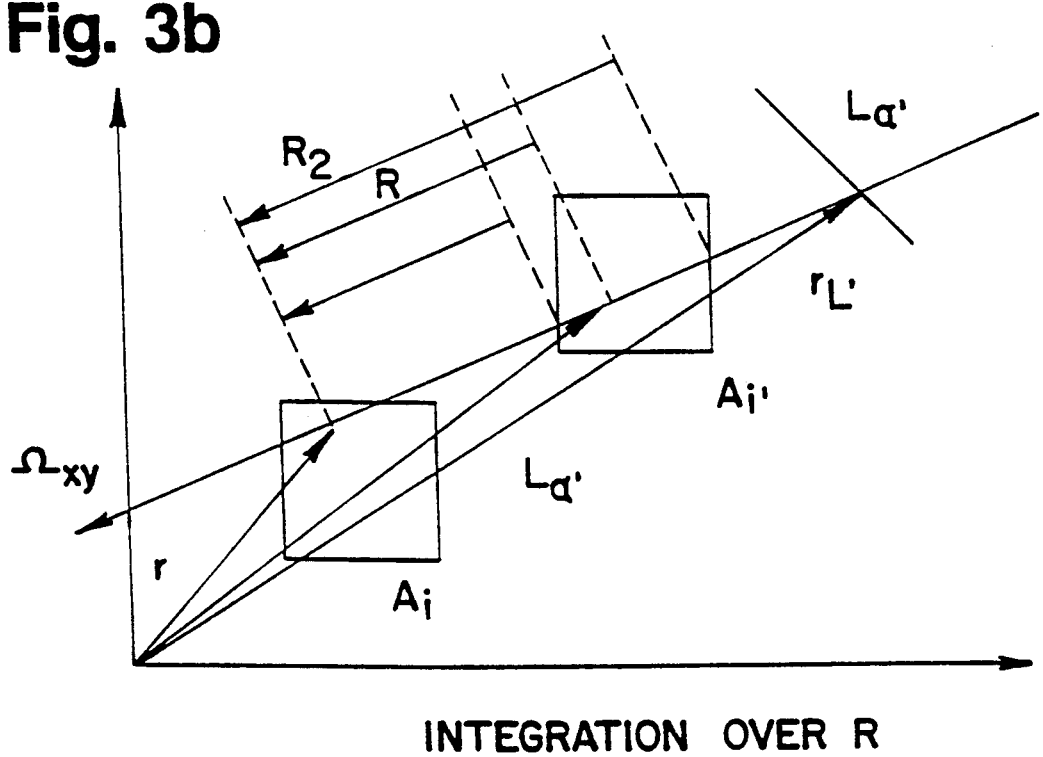

Using notation from FIG. 2 and FIG. 3 and the definitions from Eqs.(32) and (33), we can change variables in Eqs.(41)–(44) to find $$P_g(A_i \leftarrow A_{i'}) = \quad (50)$$

$$\frac{\Sigma_{t,g,i}}{A_{i'}} \int_{A_i} dA \int_{\phi_{ii'}^{min}(\vec{r})}^{\phi_{ii'}^{max}(\vec{r})} \frac{d\phi}{2\pi} \int_{R_1(\phi)}^{R_2(\phi)} dR Ki_1[\tau_g(\vec{r},\vec{r}')]$$

$$P_g(A_i \leftarrow L_{\alpha'}) = \quad (51)$$

$$\frac{4\Sigma_{t,g,i}}{L_{\alpha'}} \int_{A_i} dA \int_{\phi_{i\alpha'}^{min}(\vec{r}_{L'})}^{\phi_{i\alpha'}^{max}(\vec{r}_{L'})} \frac{d\phi}{2\pi} (Ki_2[\tau_g(\vec{r},\vec{r}_{L'})])$$

$$P_g(L_\alpha \leftarrow A_{i'}) = \quad (52)$$

$$\frac{1}{A_{i'}} \int_{L_\alpha} dL \int_{\phi_{\alpha i'}^{min}(\vec{r}_L)}^{\phi_{\alpha i'}^{max}(\vec{r}_L)} \frac{d\phi(n\cdot\Omega_{xy})}{2\pi} \int_{R_1(\phi)}^{R_2(\phi)} dR Ki_2[\tau_g(\vec{r}_L,\vec{r}')]$$

$$P_g(L_\alpha \leftarrow L_{\alpha'}) = \quad (53)$$

$$\frac{4}{L_{\alpha'}} \int_{L_\alpha} dL \int_{\phi_{\alpha\alpha'}^{min}(\vec{r}_L)}^{\phi_{\alpha\alpha'}^{max}(\vec{r}_L)} \frac{d\phi(n\cdot\Omega_{xy})}{2\pi} Ki_3[\tau_g(\vec{r}_L,\vec{r}_{L'})]$$

The integrals in R is eqs.(50) and (52), and the integrals in x(dA=dy.dx) in Eqs.(50) and (51), can be carried out analytically, leaving three integrals for numerical evaluation in each expression.

Evaluation of Collision Probabilities

Noting that $$\tau_g(\vec{r},\vec{r}') = \tau_g(\vec{r},\vec{r}-R_1\hat{\Omega}_{xy}) + (R-R_1)\Sigma_{t,g,i}$$

we can carry out integration in R as follows $$\int_{R_1(\phi)}^{R_2(\phi)} dR K i_1[\tau_g(\vec{r},\vec{r})] =$$

$$\int_0^{\frac{\pi}{2}} d\theta e^{\frac{\tau_g(\vec{r},\vec{r}) - R_1 \hat{\Omega}_{xy}}{\sin\theta}} \int_{R_2(\phi)}^{R_1(\phi)} dR e^{\frac{(R-R_1)\Sigma_{t,g,i'}}{\sin\theta}} =$$

$$\frac{1}{\Sigma_{t,g,i'}} [Ki_2(\tau_g(\vec{r},\vec{r}) - R_1 \Omega_{xy}) - \tau_g(\vec{r},\vec{r}) - R_2 \Omega_{xy}))]$$

so that Eq.(50) becomes $$P_g(A_i \leftarrow A_{i'}) = \tag{54}$$

$$\frac{\Sigma_{t,g,i}}{A_{i'}\Sigma_{t,g,i'}} \int_{A_i} dA \int_{\phi_{ii'}^{min}(\vec{r})}^{\phi_{ii'}^{max}(\vec{r})} \frac{d\phi}{2\pi} [Ki_2(\tau_g(\vec{r},\vec{r}) - R_1 \Omega_{xy})) -$$

$$Ki_2(\tau_g(\vec{r},\vec{r}) - R_2 \Omega_{xy}))]$$

Figure 4:
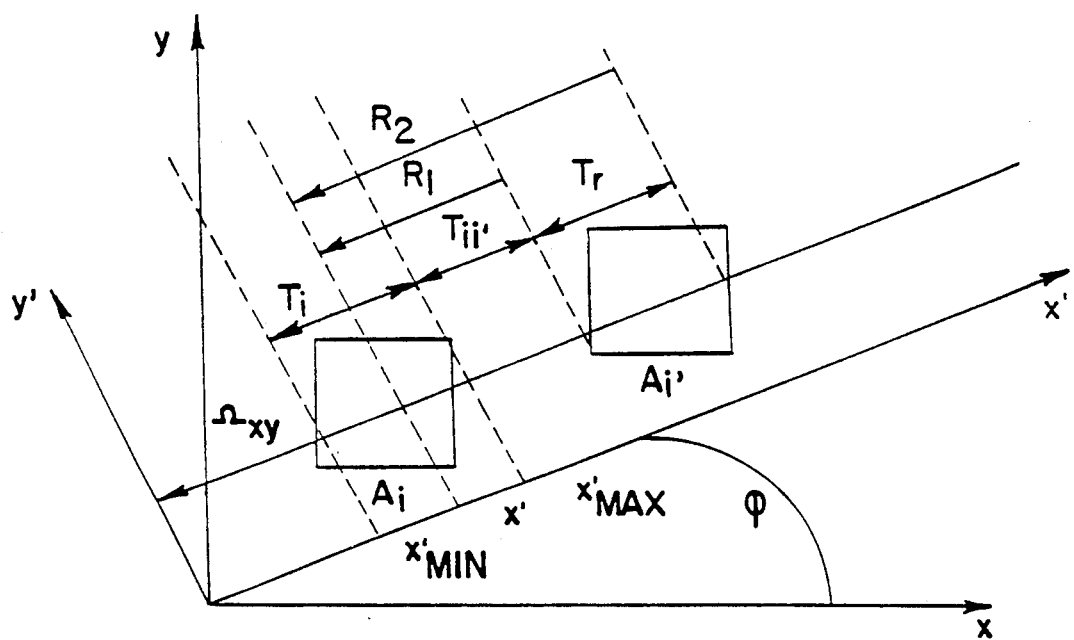
FIG. 4 illustrates a coordinate system rotation employed in the present invention in order to simplify integration.

In order to truly follow the neutron trajectory, the order of integration in Eq.(49) must be changed, and the integration in A carried out in the rotated coordinate system, where the x' axis is parallel to the direction of neutron motion (FIG. 4). With these changes, Eq.(49) can be written in the form $$P_g(A_i \leftarrow A_{i'}) = \tag{55}$$

$$\frac{\Sigma_{t,g,i}}{A_{i'}\Sigma_{t,g,i'}} \int_0^{2\pi} \frac{d\phi}{2\pi} \int_{y_{min}'}^{y_{max}'} dy' \int_{x_{min}'}^{x_{max}'} dx' \zeta(A_i) \zeta(A_{i'}) \times$$

$$[Ki_2(\tau_g(x',x' - R_1 \hat{\Omega}_{xy})) - Ki_2(\tau_g(x_*',x' - R_2 \hat{\Omega}_{xy}))]$$

where notation from FIG. 4 has been used, and where $$\tau_g(\vec{r},\vec{r} - R_1 \hat{\Omega}_{xy}) = (x_{max}' - x')\Sigma_{t,g,i} + \tau_{g,ii'}$$
$$\tau_g(\vec{r},\vec{r} - R_2 \hat{\Omega}_{xy}) = (x_{max}' - x')\Sigma_{t,g,i} + \tau_{g,ii'} + \tau_{g,i}$$
$$dA = dy'dx'$$
$$x' = x\cos\phi + y\sin\phi, \quad y = -x\sin\phi + y\cos\phi$$

For the fixed azimuthal angle $\phi$, the area integral is carried out first, but it must be set equal to zero if the neutron directions do not pass through both $A_i$ and $A_{i'}$. To address this, a new function $\zeta(Z)$ has been defined as follows $$\zeta(Z) = \begin{cases} 1, & \text{if the track intersects region } Z \\ 0, & \text{otherwise} \end{cases}$$

After the integration in x' is performed, the final expression for the volume-to-volume collision probability, ready for numerical evaluation, is obtained $$P_g(A_i \leftarrow A_{i'}) = \tag{56}$$

$$\frac{1}{A_{i'}\Sigma_{t,g,i'}} \int_0^{2\pi} \frac{d\phi}{2\pi} \int_{y_{min}'(\phi)}^{y_{max}'(\phi)} dy' \zeta(A_i)\zeta(A_{i'}) [Ki_3(\tau_{g,ii'}) -$$

$$Ki_3(\tau_{g,ii'} + \tau_{g,i}) - Ki_3(\tau_{g,ii'} + \tau_{g,i'}) + Ki_3(\tau_{g,ii'} + \tau_{g,i'} + \tau_{g,i})]$$

where $\tau_{g,i} = \tau_{g,i}(y')$ is the optical length across $A_i$ in the direction of neutron motion at a distance y' above the x'-axis, and $\tau_{g,ii'} = \tau_{g,ii'}(y')$ is the optical length between $A_i$ and $A_{i'}$ in the direction of neutron motion at a distance y' above the x'-axis.

Equation (56) is valid for $i \neq i'$. For $i = i'$ one can get a slightly different expression $$P_g(A_i \leftarrow A_i) = \tag{57}$$

$$1 - \frac{1}{A_i \Sigma_{t,g,i}} \int_0^{2\pi} \frac{d\phi}{2\pi} \int_{y_{min}'(\phi)}^{y_{max}'(\phi)} dy' [Ki_3(0) - Ki_3(\tau_{g,i})]$$

Figure 5:
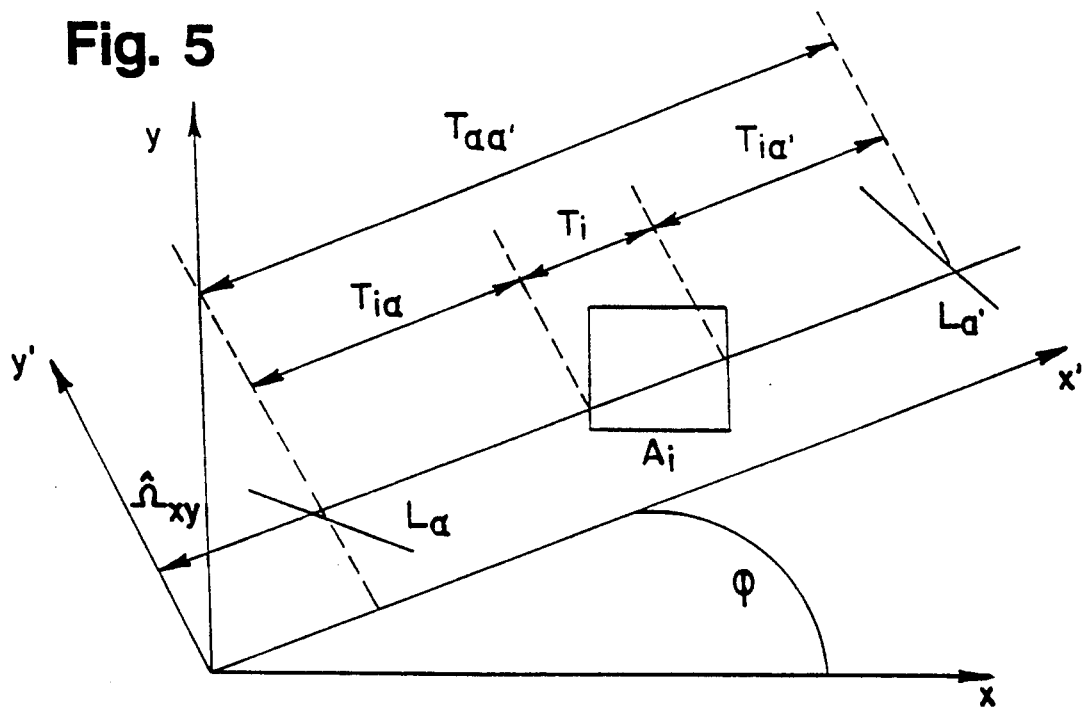
FIG. 5 illustrates the coordinates characterizing calculation of the escape, transmission and surface-to-volume collision probabilities of neutrons utilized in carrying out the present invention.

A similar procedure can be used to evaluate the surface-to-volume collision probability, defined in Eq.(46). There is no need for the integration with respect to R, so that the order of integration can be changed immediately, and integration with respect to x' can be carried out, which gives (FIG. 5)

$$P_g(A_i \rightarrow L_{\alpha'}) = \tag{58}$$

$$\frac{4}{L_{\alpha'}} \int_0^{2\pi} \frac{d\phi}{2\pi} \int_{y_{min}'(\phi)}^{y_{max}'(\phi)} dy' \zeta(A_i)\zeta(L_{\alpha'}) [Ki_3(\tau_{g,i\alpha'}) -$$

$$Ki_3(\tau_{g,i\alpha'} + \tau_{g,i})]$$

Evaluation of Escape Probabilities

After performing the integration with respect to R, using the same procedure as was explained above, the following expression (see notation from FIG. 5) is obtained from Eq.(47)

$$P_g(L_\alpha \leftarrow A_{i'}) = \frac{1}{A_{i'}\Sigma_{t,g,i'}} \int_{L_\alpha} dL \int_{\phi_{\alpha i'}^{min}(\vec{r}_L)}^{\phi_{\alpha i'}^{max}(\vec{r}_L)} \frac{d\phi(\hat{n} \cdot \hat{\Omega}_{xy})}{2\pi} \times \tag{59}$$

$$[Ki_3(\tau_g(\vec{r}_L,\vec{r}_L - R_1 \hat{\Omega}_{xy})) - Ki_3(\tau_g(\vec{r}_L,\vec{r}_L - R_2 \hat{\Omega}_{xy}))]$$

After changing the order of integration and rotating the coordinate system, one can get $$P_g(L_\alpha \leftarrow A_{i'}) = \tag{60}$$

$$\frac{1}{A_{i'}\Sigma_{t,g,i'}} \int_0^\pi \frac{d\phi}{2\pi} \int_{y_{min}'(\phi)}^{y_{max}'(\phi)} dy' \zeta(A_{i'})\zeta(L_\alpha) [Ki_3(\tau_{g,\alpha i'}) -$$

$$Ki_3(\tau_{g,\alpha i'} + \tau_{g,i'})]$$

Evaluation of Transmission Probabilities

To evaluate the transmission probability from Eq.(48), one needs only to change the order of integration and rotate the coordinate system. Using notation from FIG. 5 the following expression can be obtained $$P_g(L_\alpha \leftarrow L_{\alpha'}) = \tag{61}$$

$$\frac{4}{L_{\alpha'}} \int_0^\pi \frac{d\phi}{2\pi} \int_{y_{min}'(\phi)}^{y_{max}'(\phi)} dy' \zeta(L_\alpha)\zeta(L_{\alpha'}) Ki_3(\tau_{g,\alpha\alpha'})$$

Normalization of Generalized Collision/Transfer Probability Matrix

The system of equations, Eqs.(34) and (35), can be presented in matrix form as follows $$Tq = r \quad (62)$$

where T is a three-dimensional array, q and r are two-dimensional arrays, and the energy group is the last dimension of each array. In the case of isotropic scattering and $DP_0$ incoming flux, T consists of 4 submatrices: collision probability matrix, surface-to-volume collision probability matrix, escape probability matrix, and transmission probability matrix, with total dimensions $(N_r+N_b) \times (N_r+N_b) \times N_g$.

The elements of T are derived from Eqs.(56), (58), (60) and (61), where the coefficients in front of integrals are replaced by 1. By replacing integrals with summations for the numerical calculation, the elements of T can be presented as:

$$T_{g,i \rightarrow j} = \sum_n \frac{\Delta\phi_n}{2\pi} \sum_m \Delta y_m \zeta_{i,j} K_{g,ij}^{nm} \quad (63)$$

where $$\zeta_{in} = \begin{cases} 1, & \text{if the line intersects both regions} \\ 0, & \text{otherwise} \end{cases},$$

$$K_{g,ij}^{nm} = Ki_3(\tau_{g,ij}) - Ki_3(\tau_{g,ij} + \tau_{g,i}) -$$

$$Ki_3(\tau_{g,ij} + \tau_{g,j}) + Ki_3(\tau_{g,ij} + \tau_{g,j} + \tau_{g,i}),$$

for $i,j \leq N_r$ and $i \neq j$, $$K_{g,ij}^{nm} = Ki_3(\tau_{g,ij}) - Ki_3(\tau_{g,ij} + \tau_{g,i}),$$

for $i \leq N_r$ and $N_r < j \leq N_r + N_b$, $$K_{g,ij}^{nm} = Ki_3(\tau_{g,ij}) - Ki_3(\tau_{g,ij} + \tau_{g,i}),$$

for $N_r < i \leq N_r + N_b$ and $j \leq N_r$, and $$K_{g,ij}^{nm} = Ki_3(\tau_{g,ij}), \text{ for } N_r < i,j \leq N_r + N_b.$$

With these definitions of its elements, the T matrix is symmetric in first two dimensions, i.e.

$$T_g = T_g^T,$$

and only the lower triangular part for each energy group g needs to be calculated. The elements of q and r are given as $$q_{g,j} = \frac{Q_{g,j}}{\Sigma_{t,g,j}}, \quad \text{for } j \leq N_r,$$

$$q_{g,j} = 4 J_{g,j}^{in}, \quad \text{for } N_r < j \leq N_r + N_b,$$

$$r_{g,i} = A_i \Sigma_{t,g,i} \Phi_{g,i}, \quad \text{for } i \leq N_r, \text{ and}$$

$$r_{g,i} = L_i J_{g,i}^{out}, \quad \text{for } N_r < i \leq N_r + N_b.$$

The collision/transfer probabilities should strictly obey the conservation relations, which can be written in matrix form, as $$T^T i = p \quad (64)$$

where i is the unit vector, $T^T$ is a transpose of T, and elements of p are given as $$p_{g,i} = A_i \Sigma_{t,g,i}, \quad i \leq N_r,$$

$$p_{g,i} = \frac{L_i}{4}, \quad N_r < i \leq N_r + N_b.$$

Due to approximations in the numerical integration procedure, these conservation relations may not be maintained and therefore they are enforced by the following normalization scheme $$T_{g,ij}^n = T_{g,ij}^T + \delta_{ij} R_{g,i}, \quad 1 \leq i,j \leq N_r + N_b,$$

where $$R_{g,i} = p_{g,i} - \sum_k T_{g,ik}^T, \quad 1 \leq i,k \leq N_r + N_b$$

It must be mentioned that in our approach the correction $R_{g,i}$ is very small even for a relatively crude mesh (for tracking), and becomes negligible with mesh refinement. This is not the case in CPXY, where, due to the truncation of the path integral, the conservation relations are not a priori satisfied, and a relatively large correction must be imposed, regardless of the refinement in tracking mesh.

Calculations of Bickley-Nayler Functions

The 3rd order Bickley-Nayler functions are needed to calculate collision/transfer probability matrices. The Bickley-Nayler functions are calculated by linear interpolation:

$$Ki_3(x) = a_i x + b_i,$$

where $$i = \Delta x,$$

$$a_i = \frac{Ki_3(x) - Ki_3(x - \Delta x)}{\Delta x},$$

$$b_i = Ki_3(x - \Delta x) - \frac{Ki_3(x) Ki_3(x - \Delta x)(x - \Delta x)}{\Delta x},$$

$x \in (0, 10)$, $\Delta x = 0.01$, and for $x \geq 10$, $Ki_3(x) = 0$.

The fast subroutine BIC3 has been used to calculate $Ki_3(x)$.

Ray Tracing Algorithm for Elements of T

In our approach, the calculation of the elements of T is performed in two independent steps:
1. Geometrical Step. The in-plane numerical integration of $(y,\phi)$ is performed by covering the geometrical domain of interest (which is divided into flat flux zones) with a set of parallel integration lines at a number of discrete azimuthal angles. For each integration line, the following data are calculated:
the intersections with the zone boundaries,
the path length between the intersections,
the total number of zones on the track,
the zone, edit and materials numbers, and
the intersections with the outer boundary of the geometrical domain.
The accuracy of collision/transfer probabilities can be increased by reducing the size of the flat flux zones, increasing the number of integration angles, and decreasing the distance between parallel integration lines.
2. Numerical Integration Step. Given the geometric data and the total cross-sections for all materials, the elements of T are calculated by numerical integration.

This approach has several advantages. By decoupling the geometric part from the calculation of the collision/transfer probability matrices, the geometric data, once precalculated, can be used for each energy group and burnup step. Also, the same module for the numerical integration of the T matrices can be used for any 2D geometry (heterogeneous as well as homogeneous pin cells), providing that the abovementioned geometric data exist. This feature of our approach has been exploited to remove the most serious limitation in the exact CP formalism, i.e. geometric limitation by utilizing combinatorial geometry for ray tracing.

Multiprocessor Calculation of the Generalized T Matrix

Figure 6:
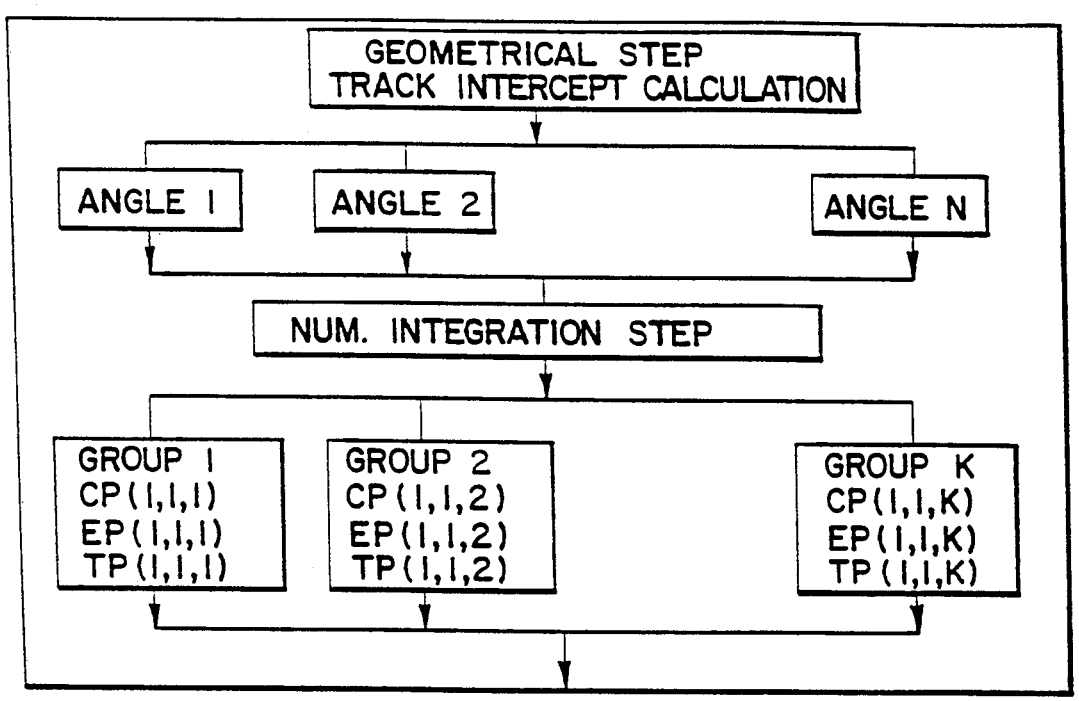
FIG. 6 illustrates in simplified block diagram form the calculation of track intercepts and the T matrix elements in parallel.

Calculation of the T matrix can proceed in parallel on advanced computers with more than one shared memory processor. Parallelism is course-grained (or subroutine-level parallelism), where each processor calculates all elements for T for a particular energy group such as illustrated in FIG. 6. This is permitted by the fact that the calculations of the T elements are independent for different energy groups. As a three-dimensional array, T is also kept in a large dynamic COMMON (in shared memory), so that each processor can access all the elements as noted above. In order to avoid possibility of address conflicts, parts of T (for g=constant), are defined as private variables for each parallel task, so that each processor can write only into a corresponding part of T. Using the same geometric data, each parallel task is performing exactly the same calculations, and the load balancing for each processor is perfect. Due to the similarity of the transport kernels, contributions to all elements of T for a particular energy group (i.e. on each processor) from one array of intercepts are calculated at the same time.

Iterative Solution of the Linear Equations

The system of multigroup eigenvalue equations, Eq.(34), (35) and (40), can be presented in the following form, which is suited for iterative solution $$A_g \phi_g = T_{c,g}\left(\overline{s_g} + \frac{1}{k} X_g f_g\right) + 4T_{s,g} j_g^{in} \qquad (65)$$

$$L j_g^{out} = T_{e,g}\left(s_g + \frac{1}{k} X_g f_g\right) + 4T_{t,g} j_g^{in} \qquad (66)$$

$$j_g^{in} = M j_g^{out}, \qquad (67)$$

where s is the scattering source, $\overline{S_g}$ is also a scattering source, but does not include the in group scattering, f is the fission source, X is the fission spectrum operator, and where $T_c$, $T_s$, $T_c$ and $T_t$ are slightly modified submatrices of T, i.e., volume-to-volume collision, surface-to-volume collision, escape and transmission probability matrices, respectively. The elements a matrix A are given as:

$$a_{g,ij} = \delta_{ij} A_j \Sigma_{s,g \to g',j} T_{c,g,j \gets i}. \qquad (68)$$

For reflective boundary conditions, the albedo matrix M is a unit matrix. Here we have a set of coupled systems of linear equations, one system for each energy group. These equations are coupled through the fission and scattering sources, as well as currents, and solved iteratively by means of the power method. The fission source is calculated iteratively through so-called "fission source" or "outer" iterations. Prior to each outer iteration, the total fission source is normalized to 1:

$$k_\infty^{(l)} = \sum_g X_g \sum_i A_i \sum_{g'} \nu\Sigma_{f,g',i} \Phi_{g',i} = \sum_i F_i^{(l)}, \qquad (69)$$

and the fission source for the next outer iteration is calculated from $$F_i^{(l+1)} = \frac{1}{k_\infty^{(l)}} F_i^{(l)}. \qquad (70)$$

For the fixed fission source in one outer iteration, Eq.(65) is solved in each energy group as the one-group fixed-source problem:

$$A\phi = b \qquad (71)$$

through the inner iteration procedure. The inner iteration scheme is accelerated through the successive overrelaxation (SOR) method:

$$\Phi_i^{(m+1)} = \Phi_i^{(m)} + \omega\left(b_i - \sum_{j=1}^{i-1} a_{ij}\Phi_j^{(m+1)} - \sum_{j=i}^{N_r} a_{ij}\Phi_j^{(m)}\right)/a_{ii} \qquad (72)$$

where m is the inner iteration number, and the energy group index is omitted. The relaxation parameter is given as $1.2 \leq \omega \leq 1.4$. The following convergence criterion is applied:

$$\max_i \left|\frac{\Phi_i^{(m+1)} - \Phi_i^{(m)}}{\Phi_i^{(m+1)}}\right| < \epsilon$$

In order to account for up-scattering in the thermal energy region, an additional loop is added through the thermal groups (the scattering source iterations). It is not necessary to iterate in the thermal region to full convergence so long as there is no convergence in the groups above the thermal iteration range. Usually the scattering source iterations are interrupted after two or three sweeps. Overrelaxation of the group fluxes from one scattering iteration to the next is done as follows:

$$\Phi_i^{(n+1)} = \Phi_i^{(n)} + \omega_t (\Phi_j^{(n+\frac{1}{2})} - \Phi_j^{(n)}) \qquad (73)$$

where the overrelaxation parameter for scattering iterations is in the range $1.4 \leq \omega_t \leq 1.6$.

After Eq.(71) is solved for the flux distribution in one group, the current equations are solved in the same group, using the new flux distribution to update the scattering source. By combining Eqs.(66) and (67), one can get:

$$Hj = c, \qquad (74)$$

where $$h_{ij} = L_i \delta_{ij} - 4T_{t,ij}, \text{ and}$$

-continued $$c = T_{t,g}\left(s_g + \frac{1}{k} X_g f_g\right).$$

The current equation, Eq.(74) is solved using direct solution methods provided in LINPACK/BLAS routines, or other routines optimized for a particular computing system.

The outer iterations proceed until each group needs just one inner iteration to converge, and the final value of $k\infty$ is calculated.

Limitations of the Collision/Transfer Probability Method

The advantages of GTRAN2 over MC calculations have been mentioned several times. Here we want to point out the limitations of GTRAN2 when compared with Monte Carlo codes:

Monte Carlo codes are continuous energy codes. In GTRAN2 a multigroup treatment is applied.

MC codes can treat any degree of anisotropy. GTRAN2 assumes isotropic scattering and neutron sources. Higher degrees of anisotropy than linear are impossible to treat with integral transport methods.

MC codes are 3D codes. GTRAN2 is a 2D code.

There is no "meshing" in MC; the domain geometry is represented exactly. Due to the flat flux approximation, "meshing" for the collision/transfer probability calculations must be much finer that the usual "zoning" used for MC calculations.

Regardless of the above-mentioned limitations with respect to MC codes, the advantages of GTRAN2 will prevail when many repetitive fast calculations are needed, as in the case of burnup calculations.

A Guide for User Applications

The GTRAN2 code has been developed on the basis of the mathematical models described above. In its stand-alone form GTRAN2 performs combinatorial geometry ray tracing and numerical integration in order to calculate collision/transfer probability matrices and solves the resulting eigenvalue equations for the eigenvalue, volumetric flux and incoming/outgoing current distributions.

Figure 7:
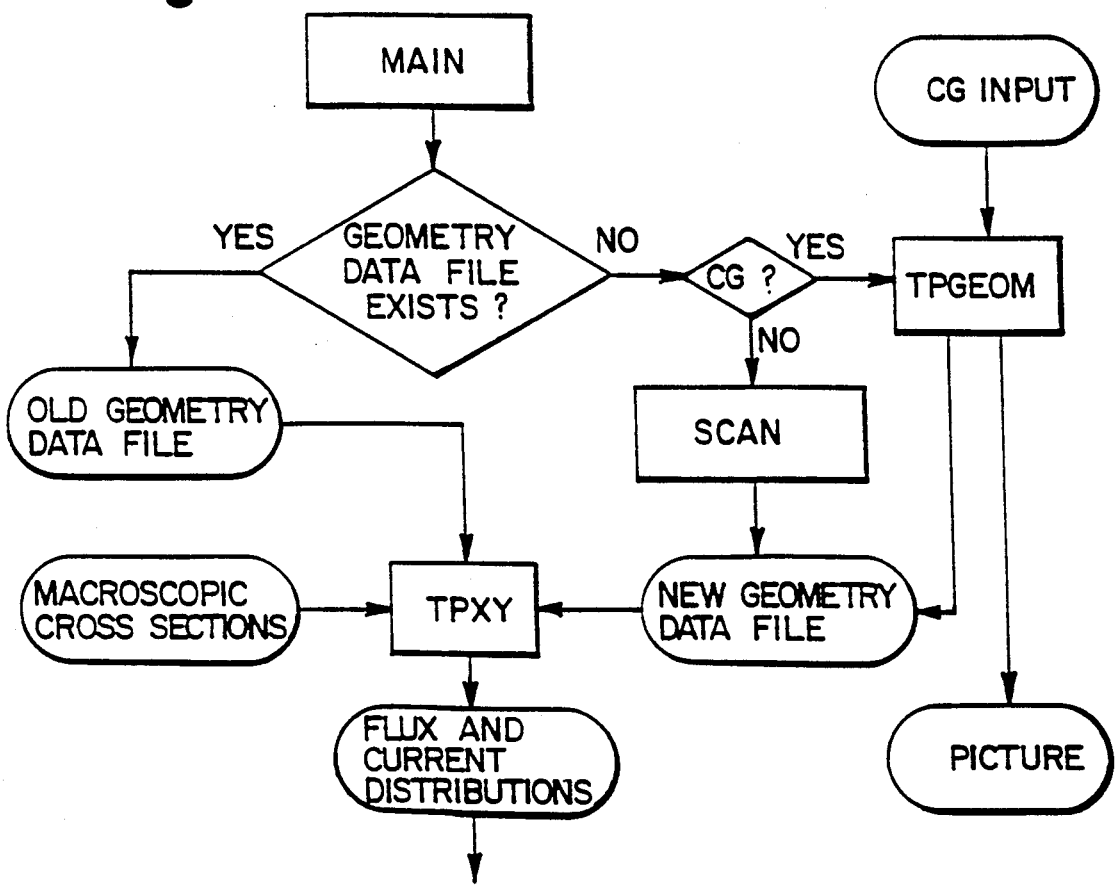
FIG. 7 is a simplified flow chart illustrating the method carried out in the GTRAN2 calculations in accordance with the present invention.

GTRAN2 consists of a main routine which calls three modules: TPGEOM, TPXY/CTP and TPXY/FLUJ (FIG. 7). TPGEOM is a modified version of PICTURE, which processes the combinatorial geometry input used by the Monte Carlo code VIM and performs ray tracing. TPXY's module CTP uses the geometry data from TPGEOM and calculates collision, escape and transmission probability matrices. TPXY's module FLUJ solves the eigenvalue equations. The GTRAN2 input consists of a description of the domain to be treated and macroscopic multigroup cross-sections for all materials.

GTRAN2 is written in FORTRAN 77 and its scalar version is portable to various computing systems. The parallel/vector version of GTRAN2 is optimized for IBM 3090/600J, and can run on up to 6 processors.

TPGEOM: A Combinatorial Geometry Ray Tracing Module

Most MC codes use similar combinatorial geometry packages to describe physical shapes and materials used in a problem, and to track particles in a random walk. The combinatorial geometry package allows the description of the domain by the combination of certain basic geometric bodies such as rectangular parallelepipeds, right circular cylinders, hexagonal prisms, etc. The basic bodies are combined using three logical operations: OR, AND and NOT. The usual procedure used in a MC code to track a particle in its random walk is to determine the zone in which a starting point is located, find the distance along a given direction to the exit point from this zone, determine the next zone the ray will enter, find the distance to the exit point of this zone, etc.

This process is continued until the next collision point is encountered or the particle reaches the outer system boundary. If the particle undergoes a collision, the type of collision (absorption or scattering) is determined. If the particle is absorbed, its history is finished (analog MC). In the case of scattering, the new directional vector and particle energy are determined and the tracking procedure is repeated. The geometric ray tracking in MC is not decoupled from the rest of the calculation (i.e. "particle physics"), and the above-mentioned procedure must be repeated for all particles, all energies and all time steps.

Figure 8:
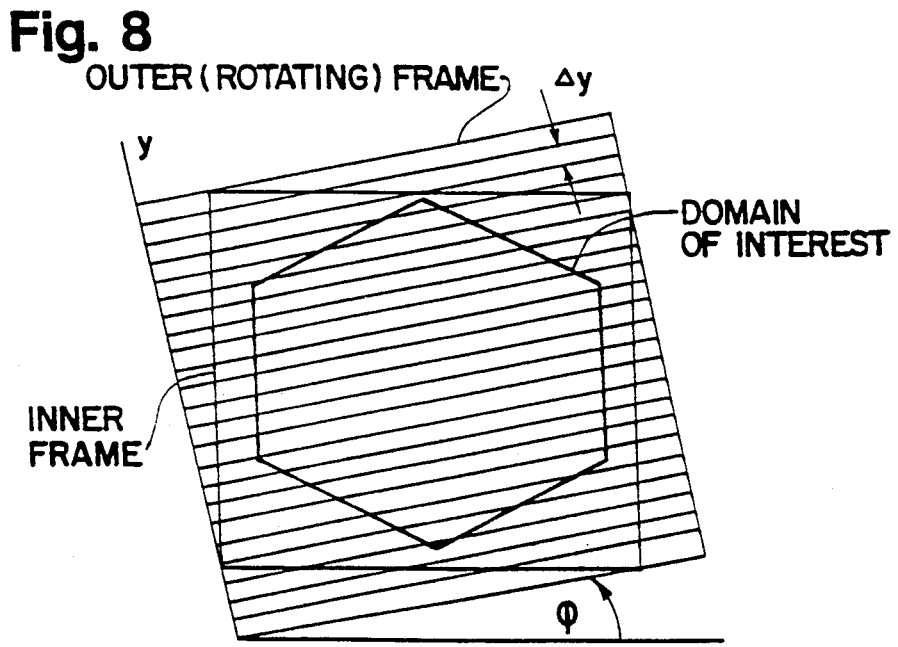
FIG. 8 illustrates the inner and outer frame setup utilized in the present invention.

In TPGEOM, this standard procedure of particle tracking was modified in order to obtain intersections of the group of bodies with the x-y plane (i.e., with the plane $z=0$). In order to evaluate the probabilities, the in-plane numerical integration over $(y,\phi)$ is performed by covering the system with a set of parallel integration lines (pseudo-particle tracks) at a number of discrete azimuthal angles. A set of outer "frames" is generated around a fixed inner frame with orientation and dimensions appropriate to the inner frame and mesh requirements. The inner frame contains all regions of interest (part of an assembly, an assembly, or several assemblies). The outer frame, with the set of parallel tracks attached to it, rotates around the inner frame as shown in FIG. 8. For each pseudo-particle track, the intersections with the zone boundaries, the path length between the intersections, the total number of zones on the track, the zone and medium numbers, and the intersections with the outer surface, are calculated.

The geometric data are stored in two ways. On computing systems with a limited amount of memory, the geometric data are stored in a file, and read in from the CTP module as needed during the simulation. On the IBM 3090, all geometric data are kept in dynamic COMMONs, thus eliminating a considerable number of slow I/O operations, and allowing unlimited access to these shared memory data from each processor during multiprocessor calculations.

As was mentioned earlier, the advantage over the MC ray tracing lays in the decoupling of the geometric part from the rest of calculations: the geometrical preprocessing is done only once, and the calculated data are repeatedly used for all energies and all time steps. Also, the calculations of geometric data for each parallel integration line and each integration angle are independent and can proceed in parallel.

In order to verify TPGEOM's accuracy and/or the accuracy of the combinatorial geometry (CG) input, the tracks are plotted and the intersections with the mesh boundaries are indicated, together with the zone, edit region or material numbers. By specifying coordinates of the picture frame, the entire assembly or any part of it can be plotted in detail. Several examples of this "printer" plotting are given in FIGS. 23-25.

TPGEOM reads from the input on logical unit 5, uses logical unit 16 as a scratch file for temporary storage of intermediate results, writes formatted output to logical unit 6, and binary ray tracing geometry data into logical unit 45 for TPXY.

The calling sequence of routines in TPGEOM is the following:

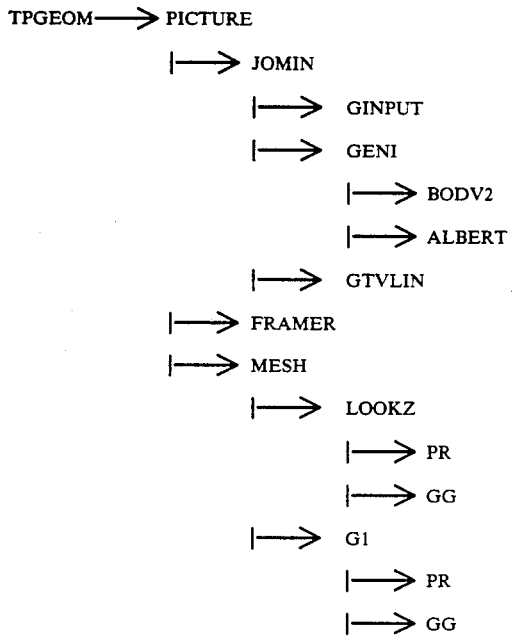

TPXY: A Collision/Transfer Probability Module and Solver Module

Given macroscopic cross-sections and ray tracing data, TPXY calculates collision, escape and transmission probabilities (the CTP module) and solves the resulting eigenvalue equations for the eigenvalue, volumetric flux and incoming/outgoing current distributions (the FLUJ module). Several options are currently available:

1. Isotropic scattering, $DP_o$ incoming flux (i.e., white reflective boundary conditions), combinatorial geometry ray tracing.
2. Isotropic scattering, specular reflective boundary conditions (BS). This option uses the modified versions of the CPXY and FLUXY modules from the CPM-2 code and is applicable to square lattice geometries with homogenized pin cells.

The discussion of the numerical calculations of collision/transfer probability matrices in the CTP module and its optimization for advanced supercomputers is given in Section 2.3. The CTP module reads from logical unit 20, 27, 45, 80 and/or 91. It writes a formatted output into logical unit 6. The calling sequence of routines in CTP is the following:

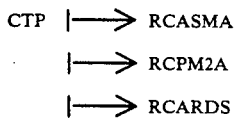

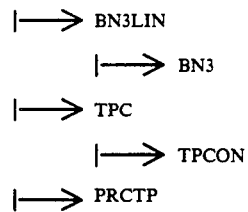

The conventional inner-outer iteration scheme has been used in the FLUJ module to solve the set of coupled systems of linear algebraic equations. For the outer or fission source iterations, the power method has been used. Prior to each outer iteration, the total fission source is normalized to one. For the fixed fission source and incoming currents in one outer iteration, the equation for the volumetric flux in each energy group is solved as the one-group fixed-source problem, through the inner iteration procedure. The inner iteration scheme is accelerated through the successive overrelaxation (SOR) method. On the IBM 3090, we have efficiently vectorized this scheme, so that between 80% and 90% of the entire FLUJ module is running in vector mode. For the current equations, the vectorizd ESSL routines, DGEMV, DGEF, and DGES are used on the IBM 3090. On other computing systems the following LINPACK routines are used: DGEMV, DGEFA and DGESL, which are provided with the code package.

The calling sequence of routines in FLUJ is the following:

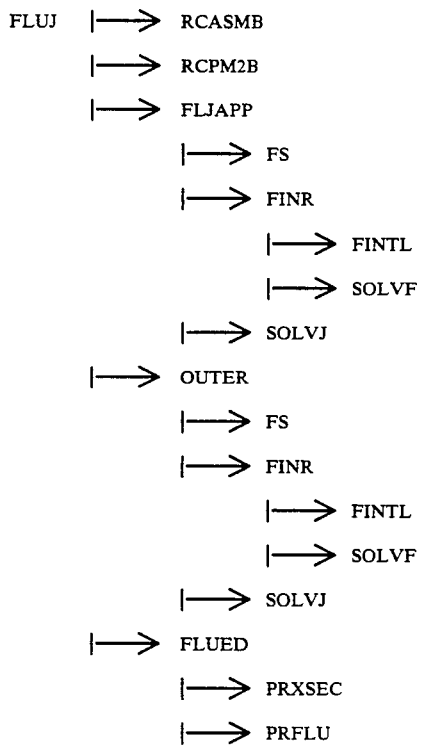

FLUJ reads from logical unit 20, 27, 80 and/or 91. It writes formatted output to logical unit 6.

Preparation of Combinatorial Geometry Input

The description of the domain to be treated and integration parameters to be used in numerical calculations of collision/transfer probabilities, are given in the input file on logical unit 6. A Monte Carlo code VIM and GTRAN2 use similar geometrical modules for particle or ray tracing. Therefore, the combinatorial geometry input cards in TPGEOM are identical to the following VIM cards:

-Card type 06⟶VIM Card type 21 - Body Cards,

-Card type 07⟶VIM Cad type 22 - Zone Cards,

-Card type 08⟶VIM Card type 23 - Zone Volumes, and

-Card type 09⟶VIM Card type 24 - Zone Compositions.

The other input cards are specific to the TPGEOM input, for example, the input cards related to the outer boundary meshing or the fixed frame coordinates.

Figure 10:
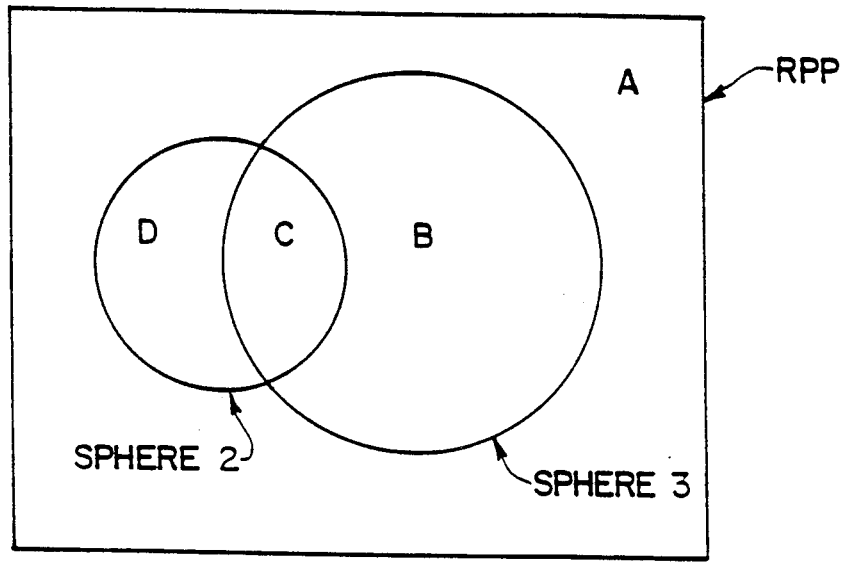
FIGS. 10, 11 and 12 illustrate three examples of combinatorial geometries utilized in the present invention.
Figure 11:
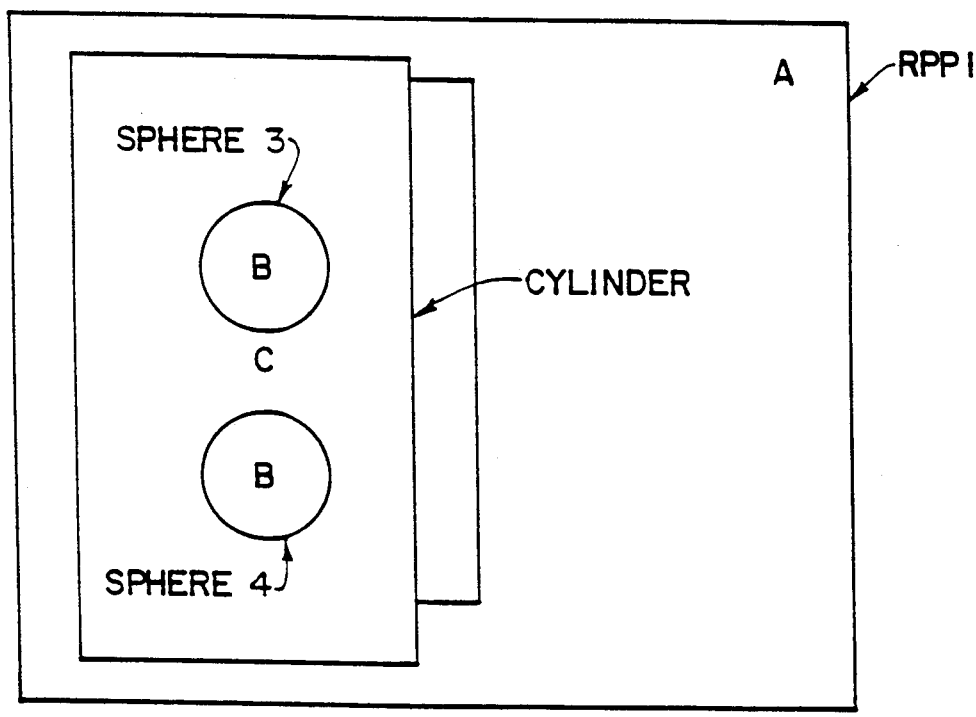
Figure 12:
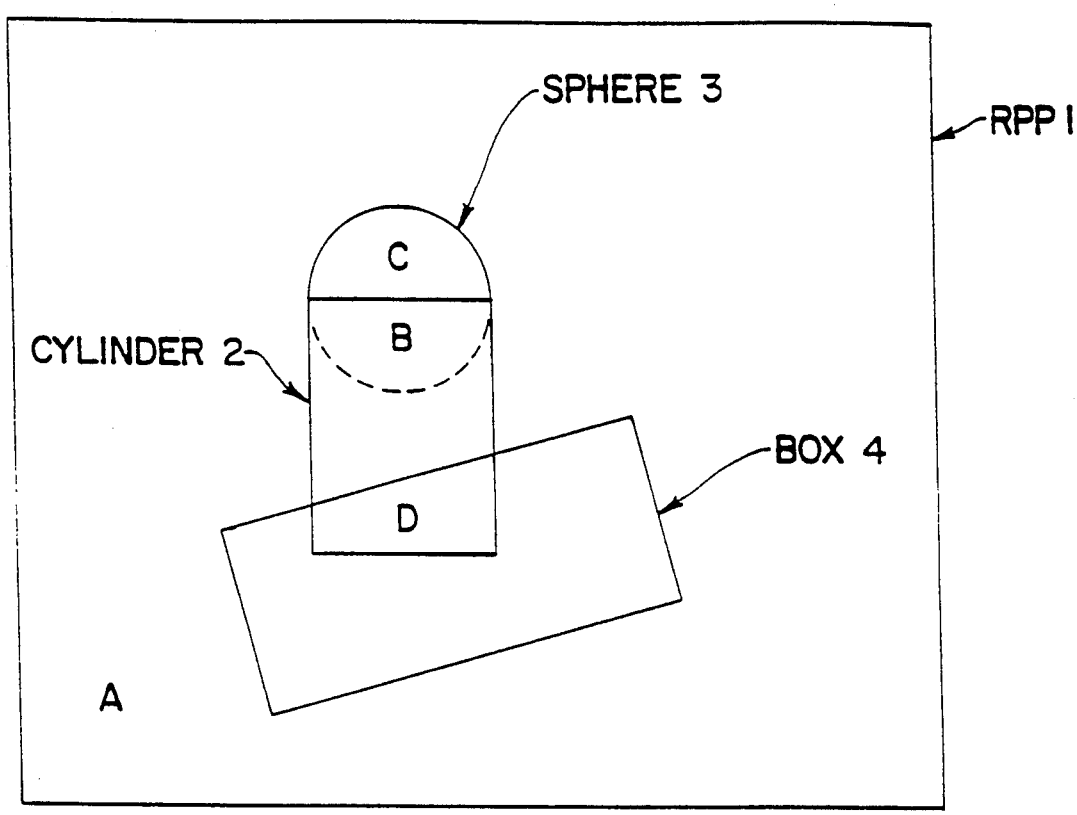

As was mentioned earlier, the combinatorial geometry package allows the description of the geometrical domain of interest by the combination of certain basic geometric bodies. The description of available body types is given in Table 1, and the body types are illustrated in FIG. 9. Each zone (a flat flux zone, in the case of GTRAN2) is defined by the set of basic bodies which are combined using three logical operations: OR, AND and NOT. The AND and NOT operators do not appear explicitly in the input. A "+" means AND and a "−" means NOT. The use of OR, AND and NOT operations in defining combinatorial geometry zones is illustrated in FIGS. 10 through 12. Tables 1a, 1b and 1c define the geometric zones and inputs for the combinatorial geometries respectively shown in FIGS. 10, 11 and 12.

Having in mind that the 3D combinatorial geometry package is used to perform 2D ray tracing for GTRAN2, the user must specify the z coordinates of the bodies as follows:

Zmin=0
Zmax=1.

If the height of the body in the z-direction is required, the user must specify HZ=1. Consequently, the zone volumes must be calculated assuming a unit height.

The optimal choice of the flat flux zones, flat current zones on the outer boundary, number of integration angles and the spacing between parallel integration lines used for ray tracing cannot be generalized. For each problem, the user must do some experimenting to find the optimal parameters. In addition, the external domain boundary must be subdivided into smaller meshes. The integration over $\phi$ is from 0° to 180°, in equal angles of 180°/NANGLE. The spacing between parallel integration lines should be chosen so that the smallest zone is covered with at least 2-3 lines.

In addition to the description of the geometric domain to be treated, the user must define a rectangular frame which will contain the entire geometrical domain shown in FIG. 8. The frame must not lie on the external domain boundary (for example, the outer assembly boundary). There must be a gap of at least 0.2 cm between the frame and the outer domain boundary.

Preparation of the combinatorial geometry input can be a long and error prone process. In the next subsection we will recommend some strategies which can help the user in preparing and testing the input.

TABLE 1

| Combinatorial Geometry Body Cards | | | | | |
|---|---|---|---|---|---|
| Body Type | Card Name | Columns | Order | Body Data | Description |
| BOX | BOX | 3-5 | 1ST | | |
| | | 6-10 | | | BODY NUMBER |
| | | 11-20 | | VX | COORDINATES OF A CORNER |
| | | 21-30 | | VY | |
| | | 31-40 | | VZ | |
| | | 41-50 | | H1X | EDGE 1 VECTOR |
| | | 51-60 | | H1Y | |
| | | 61-70 | | H1Z | |
| | | 11-20 | 2ND | H2X | EDGE 2 VECTOR |
| | | 21-30 | | H2Y | |
| | | 31-40 | | H2Z | |
| | | 41-50 | | H3X | EDGE 3 VECTOR |
| | | 51-60 | | H3Y | |
| | | 61-70 | | H3Z | |
| RPP | RIGHT PARALLEL-EPIPED | 3-5 | 1ST | | |
| | | 6-10 | | | BODY NUMBER |
| | | 11-20 | | XMIN | X-DIMENSIONS |
| | | 21-30 | | XMAX | |
| | | 31-40 | | YMIN | Y-DIMENSIONS |
| | | 41-50 | | YMAX | |
| | | 51-60 | | ZMIN | Z-DIMENSIONS |
| | | 61-70 | | ZMAX | |
| SPH | SPHERE | 3-5 | 1ST | | |
| | | 6-10 | | | BODY NUMBER |
| | | 11-20 | | VX | COORDINATES OF CENTER |
| | | 21-30 | | VY | |
| | | 31-40 | | VZ | |
| | | 41-50 | | R | RADIUS |
| RCC | RIGHT CIRCULAR | 3-5 | 1ST | | |
| | | 6-10 | | | BODY NUMBER |
| | | 11-20 | | VY | COORDINATES OF BASE CENTER |
| | | 21-30 | | VY | |

TABLE 1-continued

Combinatorial Geometry Body Cards

| Body Type | Card Name | Columns | Order | Body Data | Description |
|---|---|---|---|---|---|
| | | 31-40 | | VZ | |
| | | 41-50 | | HX | LENGTH OF AXIS |
| | | 51-60 | | HY | |
| | | 61-70 | | HZ | |
| | | 11-20 | 2ND | R | RADIUS |
| REC | RIGHT ELLIPTIC CYLINDER | 3-5 | 1ST | | |
| | | 6-10 | | | BODY NUMBER |
| | | 11-20 | | VX | COORDINATES OF BASE CENTER |
| | | 21-30 | | VY | |
| | | 31-40 | | VZ | |
| | | 41-50 | | HX | LENGTH OF AXIS (HEIGHT) |
| | | 51-60 | | HY | |
| | | 61-70 | | HZ | |
| | | 11-20 | 2ND | R1X | MINOR RADIUS VECTOR |
| | | 21-30 | | R1Y | |
| | | 31-40 | | R1Z | |
| | | 41-50 | | R2X | MAJOR RADIUS VECTOR |
| | | 51-60 | | R2Y | |
| | | 61-70 | | R2Z | |
| CYL | RIGHT CIRCULAR CYLINDER IN Z-DIRECTION | 3-5 | 1ST | | |
| | | 6-10 | | | BODY NUMBER |
| | | 11-20 | | VX | COORDS OF CENTER |
| | | 21-30 | | VY | |
| | | 31-40 | | VZ | |
| | | 41-50 | | HX | AXIS LENGTH (HEIGHT) |
| | | 51-60 | | R | RADIUS OF BASE |
| ELL | ELLIPSOID | 3-5 | 1ST | | |
| | | 6-10 | | | BODY NUMBER |
| | | 11-20 | | V1X | COORDINATES OF FOCI |
| | | 21-30 | | V1Y | |
| | | 31-40 | | V1Z | |
| | | 41-50 | | V2X | |
| | | 51-60 | | V2Y | |
| | | 61-70 | | V2Z | |
| | | 11-20 | 2ND | L | LENGTH OF MAJOR AXIS |
| TRC | TRUNCATED RIGHT-CONE | 3-5 | 1ST | | |
| | | 6-10 | | | BODY NUMBER |
| | | 11-20 | | VX | COOR. OF BASE CENTER |
| | | 21-30 | | VY | |
| | | 31-40 | | VZ | |
| | | 41-50 | | HX | AXIS VECTOR (HEIGHT) |
| | | 51-60 | | HY | |
| | | 61-70 | | HZ | |
| | | 11-20 | 2ND | R1 | RADIUS OF LOWER BASE |
| | | 21-30 | | R2 | RADIUS OF UPPER BASE |
| WED | RIGHT ANGLE WEDGE | 3-5 | 1ST | | |
| | | 6-10 | | | BODY NUMBER |
| | | 11-20 | | VX | COORDS OF A RIGHT ANGLE CORNER |
| | | 21-30 | | VY | |
| | | 31-40 | | VZ | |
| | | 41-50 | | H1X | PERPENDICULAR TRIANGLE SIDE VECTOR |
| | | 51-60 | | H1Y | |
| | | 61-70 | | H1Z | |
| | | 11-20 | 2ND | H2X | |
| | | 21-30 | | H2Y | |
| | | 31-40 | | H2Z | |
| | | 41-50 | | H3X | RIGHT ANGLE EDGE VECTOR |
| | | 51-60 | | H3Y | |
| | | 61-70 | | H3Z | |

WARNING: When using WED bodies for azimuthal detail, be sure that adjacent disjoint wedges overlap slightly. Otherwise, tracking across azimuthal interfaces may fail.

| Body Type | Card Name | Columns | Order | Body Data | Description |
|---|---|---|---|---|---|
| ARB | ARBITRARY POLY-HEDRON | 3-5 | 1ST | | |
| | | 6-10 | | | BODY NUMBER |
| | | 11-20 | | V1X | COORDINATES OF VERTICES |
| | | 21-30 | | V1Y | |
| | | 31-40 | | V1Z | |
| | | 41-50 | | V2X | |
| | | 51-60 | | V2Y | |
| | | 61-70 | | V2Z | |
| | | 11-20 | 2ND | V3X | |
| | | 21-30 | | V3Y | |

TABLE 1-continued

Combinatorial Geometry Body Cards

| Body Type | Card Name | Columns | Order | Body Data | Description |
|---|---|---|---|---|---|
| | | 31-40 | | V3Z | |
| | | 41-50 | | V4X | |
| | | 51-60 | | V4Y | |
| | | 61-70 | | V4Z | |
| | | 11-20 | 3RD | V5X | |
| | | 21-30 | | V5Y | |
| | | 31-40 | | V5Z | |
| | | 41-50 | | V6X | |
| | | 51-60 | | V6Y | |
| | | 61-70 | | V6Z | |
| | | 11-20 | 4TH | V7X | |
| | | 21-30 | | V7Y | |
| | | 31-40 | | V7Z | |
| | | 41-50 | | V8X | |
| | | 51-60 | | V8Y | |
| | | 61-70 | | V8Z | |
| | | 11-20 | 5TH | | FACE #1 FACE DESCRIPTION |
| | | 21-30 | | | FACE #2 (E.G. "1234.") |
| | | 31-40 | | | FACE #3 |
| | | 41-50 | | | FACE #4 |
| | | 51-60 | | | FACE #5 |
| | | 61-70 | | | FACE 63 |

NOTE: Face descriptions are four digit numbers indicating the numbering sequences of the corners of each face in either clockwise or counter-clockwise order.

| Body Type | Card Name | Columns | Order | Body Data | Description |
|---|---|---|---|---|---|
| RHP | RIGHT HEXAGONAL PRISM IN Z-DIRECTION | 3-5 | 1ST | | |
| | | 6-10 | | | BODY NUMBER |
| | | 11-20 | | VX | COORDINATES OF BASE CENTER |
| | | 21-30 | | VY | |
| | | 31-40 | | VZ | |
| | | 41-50 | | HZ | AXIS LENGTH (HEIGHT) |
| | | 51-60 | | W | WIDTH ACROSS FLATS OF BASE (IN X-DIRECTION) |

NOTE: The data above should be used for body cards, GTRAN2 type 6 (APPENDIX A). The symbols BOX, RPP, SPH, etc. are "character type" names given to each of the body types. Quantities listed under 'BODY DATA', above, represent physical dimensions to be supplies by the user.

TABLE 1a

| Zone | Input | |
|---|---|---|
| A | +1 − 2 − 3 | (Zone A is composed of all points interior to RPP No. 1 and exterior to spheres 2 and 3.) |
| B | +3 − 2 | (Zone B is composed of all points interior to sphere 3 and exterior to sphere 2.) |
| C | +2 + 3 | (Zone C is composed of all points which are in sphere 2 and are also in sphere 3.) |
| D | +2 − 3 | (Zone D is composed of all points interior to sphere 2 and exterior to sphere 4.) |
| E | 0R + 2 0R + 3 | (if desired, one zone, the total of zones B, C, and D, can be defined as zone E.) |

TABLE 1b

| Zone | Input | |
|---|---|---|
| A | +1 − 2 | (all points interior to the RPP and outside the cylinder.) |
| B | 0R + 3 0R + 4 | (all points interior to sphere 3 or 4. |
| C | +2 − 3 − 4 | (all points in the cylinder but not in the spheres. |

TABLE 1c

| Zone | Input | |
|---|---|---|
| A | +1 − 2 − 3 | (all points interior to the cylinder, and exterior to the cylinder and sphere. Note that zone A includes all of the space contained inside body 4, except that portion inside cylinder 2. This space can be assign a special zone number, if desired. If, as in the example, it is nit desired, it is not necessary.) |
| B | +2 − 4 | (all points interior to the cylinder, and outside the box.) |
| C | +3 − 2 | (all points interior to the sphere and external to the cylinder.) |
| D | +2 + 4 | (all points interior to the cylinder and also inside the box.) |

Diagnostics

Before attempting to run either GTRAN2 modules, TPGEOM and TPXY, the user must make sure that the combinatorial geometry input (logical unit 5) is error free. The following steps are recommended:

1. Turn on the TPGEOM module flag. Turn off the TPXY module flag.
2. Turn on the plotting flag.
3. Request all three plot options: ICNT=−1,IRG=0, plot zone geometry, ICNT=−1,IRG=−1, plot edit region geometry, ICNT=0 (must be zero for the last plot), IRG=1, plot material geometry,
4. For each plot, request only one angle.
5. If no error is detected, refine the line step, and increase the number of angles, NANGLE.
6. If no error is detected, turn off the plotting flat (IPICT=0), and turn on the TPXY module flag (ITPXY=1).

If an error is detected by TPGEOM, the code will stop plotting, and the coordinates of the site which is in an erroneously defined part of the combinatorial geometry will then be printed, along with the type of problem (undefined point or multiple zones defined). When the diagnostic parameter IDBG is set to 1, and/or when certain tracking errors occur in the combinatorial geometry package, subroutine PR prints out several pertinent variables which are defined in Table 2. Also, floating point body data in array FPD are printed out as shown in Table 3. Fixed point data in array MA are printed out as shown in Table 4.

With the help of a plot and printed diagnostic data, the user can determine the last zone which was processed and the next zone where the error occurred. Also, by analyzing the edit region and material plots, the user can check if the edit region and material number were properly assigned.

If a crude step was used (for example, DELT=0.5 cm) when an error was detected, it may be difficult to find out the zone where the error occurred. The user should refine the step (DELT=0.1 cm, or even DLET=0.05 cm), and define the frame with smaller dimensions to zoom on a particular area where the tracking error occurred. After an error has been detected and corrected, the user should continue with the same procedure, until all errors are removed.

TABLE 2

Definition of Combinatorial Geometry Variables Printed out by Subroutine PR

| Variable | Definition |
|---|---|
| IR | Zone number where the neutron is currently. |
| XB(3) | Cartesian coordinates of the starting point of the current trajectory. For lattices (IGEOM = −1 or −2) these are the intra-cell coordinates. |
| XP(3) | Temporary storage of XB(3). |
| WB(3) | Direction cosines of neutron trajectory. |
| IRPRIM | Next zone number that the neutron will enter. |
| NASC | Body number of the last calculated intersection. (if .LT. 0, collision point not on body surface) |
| LSURF | Surface of body NASC where intersection occurred. Positive if particle is entering the body and negative when exiting. |
| NBO | Body number and a sign used to define zones. Input in zone description as positive when zone is contained in body and as negative if zone is outside body |
| LRI | Entry surface calculated in GG. (−RIN away) |
| LRO | Exit surface calculated in GG. (+ROUT away) |
| KLOOP | Trajectory index of present path. |
| LOOP | Index of last trajectory calculated for body NBO.LOOP and KLOOP are used to skip calculation if RIN and ROUT for a body which has already been checked in another zone for the same trajectory. |
| ITIPE | Body type of body NBO.<br>ITIPE  Name<br>1  ARP<br>2  SPH<br>3  RCC<br>4  REC<br>5  TRR<br>6  ELL<br>7  BOX<br>8  WED<br>9  RPP<br>10  RHP<br>11  CYL |
| N | Location in MA array of first body making up code zone IPR. Zone IR may be union (OR) of "code" zones. |
| NUM | Location in MA array of last Body making up code zone IRP. |
| LOCAT | Starting location in MA array of integer data for |
| ISAVE | Location in MA array of body NBO. |
| INEXT | Location in MA of next code zone to be searched for possible entry. |
| IRP | Code zone that neutron will enter. |
| INEX | Location in MA array of index in MA for the second code zone to be searched for possible entry. Note:<br>First   IRP = MA(INEXT)<br>       INEX = INEXT + 1<br>Then   INEXT = MA(INEX)<br>Second IRP = MA(INEXT), etc. |
| LDATA | Storage location in MA array for additional leap frog data for determining the next zone entered. |
| RIN | Distance from starting point XB to entry of body NBO. |
| ROUT | Distance from starting point XB to exit of body NBO. |
| SMIN | Minimum distance from starting point XB to exit of code zone. |
| DIST | Distance from XB to current point. (In combinatorial geometry, on the boundary of the next zone, or at the collision point. At collision, XB(new) = XB(old) + WB*DIST. |

TABLE 2-continued
Definition of Combinatorial Geometry Variables Printed out by Subroutine PR

| Variable | Definition |
| --- | --- |
| XH | Distance from previous point to boundary crossing or to point of collision (cm). |
| DELTA | Input parameter for step-across boundaries in combinatorial geometries. |
| SDEL | 0 if no boundary crossing occurs, DELTA if a boundary crossing occurs. |
| STMFP | Number of mean free paths remaining to collision point. |
| DIST0 | (combinatorial geometry only) Distance from XB to next collision. Used in G1/G2 to avoid calculating the next zone before the intersection. |
| PINF | An artificial infinity. |
| MARK | 0 (next zone), 1 (collision), −2 (interior vacuum or reflection). |

TABLE 3
Layout of the FPD Array in BPOINTER Container

| Position in Container Array | Information Stored | Size (REAL*8 Words) | Description |
| --- | --- | --- | --- |
| KFPD | RIN for Body 1 | 1 | Path length data for last trajectory in Body 1 |
| KFPD + 1 | ROUT for Body 1 | 1 | |
| KFPD + 2 | First 6 words of real data for Body 1 | 6 | Read from first card of Body 1 card set. |
| KFPD + 8 | Remaining words of real data for Body 1 | $N_1$ | $N_1$ depends on body type. See Table 1. |
| KFPD + 8 + $N_1$ | RIN for Body 2 | 1 | Same information as above, but for Body 2. |
| | ROUT for Body 2 | 1 | |
| | Remaining data for Body 2 | $N_2$ | |
| | Repeat for all bodies. | 4 | |

NOTE: Eight words are set aside at the end of the FPD array, but are not used

TABLE 4
Layout of the MA Array in BPOINTER Container

| Position in Container Array | Information Stored | Size (REAL*8 Words) | Description |
| --- | --- | --- | --- |
| KMA | 1 (body number) | | |
| KMA + 1 | LOOP for Body 1 | | |
| KMA + 2 | Body type (ITIPE) | | |
| KMA + 3 | LRI | 7 | Body 1 data (each body requires seven words of information). |
| KMA + 4 | LRO | | |
| KMA + 5 | | | |
| KMA + 6 | Beginning location in FPD of body data | | |
| KMA + 7 | Body 2 | 7 | Same information and order as for body 1. |
| KMA + 14 | | | |
| KMA + (L-1)*7 | Body No. (L) | 7 | Body No. L last body. |
| KMA + L*7 | 1 (zone number) | 1 | Beginning of code zone information. |
| | No. of first body in this zone | | |
| | Location of integer data for this body | | Beginning of information about bodies defining code zone 1. |
| | First zone to search upon exiting this body. Location of next zone to be searched. | 4 | Integer data location is given by 7*(Body No.)-6. The last two words in each set of body data initiate the "leap frog" process by which the code stores possible zones which can be entered upon exiting this body in that particular zone. These zones are checked by the code when the next zone entered is being determined. If the next zone is not located from this stored data, all zones are searched. |
| | Data on second body in this zone | 4 | |
| | Data on last body in the zone | 4 | |
| | Zone 2 | 1 | |
| | Body information | | Same information as above for code zone 2. |
| KMA + LDATA | Code search information (leap-frog) | 2*NAZT | Storage set aside for determining the zone to be searched and where the next zone number is located. |

NOTE:
An input zone consists of a single code zone or a union (OR) of code zones, where a code zone is the intersection (+ or −) of bodies. NAZT is the total number of possible code zones which be entered when leaving all zones. It is the sum of columns 6-10 of zone cards type 07 (Appendix A).

Preparation of Multigroup Cross-Section Input

In order to evaluate volume-to-volume collision probabilities and escape probabilities, Eqs.(36) and (38), the angular dependency of the volumetric sources must be know. The fission source does not usually depend on $\Omega$, but the differential scattering cross-sections in the scattering source depend on the cosine of the scattering angle between incoming and outgoing neutron directions $\mu_0 = \hat{\Omega}.\hat{\Omega}'$. If isotropic scattering is assumed, the volumetric sources do not depend on $\Omega$ any more, and the evaluation of collision and escape probabilities is simplified (Eqs. [41] and [43]). If linearly anisotropic scattering is assumed, the volumetric sources and fluxes could be expanded into spherical harmonics. In 2D, only three moments are present in the volumetric source expansion, as well as in the volumetric flux expansion. Consequently, instead of one collision probability matrix in the case of isotropic scattering, one needs to calculate 9 collision probability matrices relating different flux and source moments, which requires considerably more CPU time and memory. To remedy this, so-called transport correction is used, i.e., it is assumed that problems with linearly anisotropic scattering can be replaced by problems with isotropic scattering, provided that the total and scattering cross-sections are reduced.

The differential scattering cross-section is usually expanded in Legendre polynomials, $P_l(\mu_0)$, where $\mu_0 = \hat{\Omega}.\hat{\Omega}'$, is:

$$\Sigma_s(\mu_0, E \to E') = \sum_{l=0}^{\infty} \frac{2l+1}{4\pi} \Sigma_{sl}(E \to E')P_l(\mu_0), \quad (75)$$

where the angular components are defined as $$\Sigma_{sl}(E \to E') = 2\pi \int_{-1}^{1} d\mu_0 \Sigma_s(\mu_0, E \to E')P_l(\mu_0).$$

The linear anisotropic scattering approximation means that only the first two terms in Eq.(75) are considered, i.e.

$$\Sigma_s(\mu_0, E \to E') \approx \frac{1}{4\pi} [\Sigma_{s0}(E \to E') + 3\mu_0 \Sigma_{s1}(E \to E')], \quad (76)$$

which after integration over E' gives $$\Sigma_s(\mu_0, E) \approx \frac{1}{4\pi} [\Sigma_{s0}(E) + 3\mu_0 \bar{\mu}_0(E)\Sigma_{s0}(E)] = \quad (77)$$

$$\frac{1}{4\pi} [\Sigma_{s0}(E) + 3\mu_0 \Sigma_{s1}(E)],$$

where $$\bar{\mu}_0(E) = \frac{2\pi \int \int d\mu_0 dE' \mu_0 \Sigma_s(\mu_0, E \to E')}{2\pi \int \int d\mu_0 dE' \Sigma_s(\mu_0 E \to E')} = \frac{\Sigma_{s1}(E)}{\Sigma_{s0}(E)}.$$

Usually, linearly anisotropic scattering is not treated explicitly in the integral transport methods. In fact, scattering is assumed to be isotropic, but the total and scattering cross-sections are reduced (transport corrected) as follows:

$$\Sigma^{tr}_{s,g' \to g} = \begin{cases} \Sigma_{s0,g' \to g}, & g' \neq g \\ \Sigma_{s0,g' \to g} - \bar{\mu}_{0,g}\Sigma_{s0,g}, & \text{otherwise} \end{cases} \quad (78)$$

i.e., the diagonal of the $P_0$ scattering matrix is corrected, and the transport-corrected total cross-section is given by $$\Sigma^{tr}_{t,g} = \Sigma_{t,g} - \bar{\mu}_{0,g}\Sigma_{s0,g}.$$

From Eq.(78), by summing over g', we get $$\Sigma^{tr}_{s,g} = \sum_{g'} \Sigma_{s0,g' \to g} - \bar{\mu}_{0,g}\Sigma_{s0,g} = \Sigma_{s0,g} - \Sigma_{s1,g}. \quad (79)$$

When preparing the cross-section data file for GTRAN2, the user should have in mind that GTRAN2 expects transport corrected total cross-sections. Cross-sections generated from the nuclear data libraries used for CASMO-3 or CPM2 are transport corrected.

The stand-alone version of GTRAN2 reads macroscopic cross-sections in card image format from logical unit 20. The following macroscopic cross-sections are needed by GTRAN2 for each material/composition and each energy group:

| | |
|---|---|
| SA | macroscopic absorption cross-section, |
| SF | macroscopic fission cross-sections, |
| SNF | macroscopic nu fission cross-section, |
| ST | macroscopic total cross-section, transport corrected, |
| STOTSC | macroscopic total scattering cross-section, transport corrected, |
| SSC | P0 macroscopic scattering cross-section matrix, |
| CHI | fraction of fission neutrons in each group. |

GTRAN2 can also read from the interface cross-section data files generated by CASMO-3 (logical units 80 and 91) or CPM2 (logical unit 27). These files are binary.

Computer Requirements for Program Execution

This Section provides the user with general information for the execution of GTRAN2 on different computer systems. Brief description of logical unit assignment, sample procedures to compile, link and execute the code, as well as execution statistics on different computer systems are presented.

Description of Logical Units

GTRAN2 needs several input files and writes into several output files. Scratch files are used for temporary storage of intermediate results during execution. Different computer systems have different requirements for allocating files, but most allow the files to be defined in the coding of the program. We use the FORTRAN statements OPEN and CLOSE (MAIN routine) to define a status of the majority of the files. On some computer systems (UNIX workstations, Cray) the files on logical units 5 and 6 (standard input and output) are not defined through the OPEN statement. Rather, they are assigned at run time by the user, so that the user has some flexibility in choosing the input and output file names. A brief description of the input and output files follows:

| Unit Number | Name | Formatted | Description |
|---|---|---|---|
| 5 | | Yes | Combinatorial geometry input (Appendix A). |
| 6 | | Yes | GTRAN2 output. |
| 9 | GTIME | Yes | Summary of execution times for the major modules. |
| 16 | TPG.TMP | Yes | Temporary storage. |

-continued

| Unit Number | Name | For-matted | Description |
|---|---|---|---|
| 20 | TPXY.IN | Yes | GTRAN2 input (Appendix B). |
| 27 | GCXYOUT | No | Cross section data from CPM-2. |
| 45 | TPGOUT | No | Ray tracing data generated by TPGEOM. |
| 80 | TPXY.FILE | No | Cross section data from CASMO-3. |
| 81 | | Yes | Error messages. |
| 91 | TPXY.FILE11 | No | Cross section data from CASMO-3. |

The following scratch files are also used:

| Unit Number | Formatted |
|---|---|
| 21 | No |
| 25 | No |
| 31 | No |
| 34 | No |

Memory Consideration

The memory requirements for storing the GTRAN2 data will vary a lot depending on the specific problem. The following parameters have a major influence:

N1 - Number of zones,
N2 - Number of energy groups,
N3 - Number of parallel integration lines,
N4 - Number of integration angles,
N5 - Number of intercepted zones per integration line,
N6 - Number of meshes on the external boundary (number of faces),
N7 - Number of compositions (materials),
N8 - Number of edit regions.

The geometric data and collision/transfer probability matrices are stored in two ways. On computing systems with a limited amount of memory, the geometric data are stored in a file, and read in from the CTP module as needed during the simulation. On the IBM 3090 with large virtual memory, all geometric data are kept in dynamic COMMONs, thus eliminating a considerable number of slow I/O operations, and allowing unlimited access to these shared memory data from each processor during multiprocessor calculations.

On computing systems with large real/virtual memory, collision/transfer probability matrices are stored in 3D arrays as follows:

CP(N1,N1,N2) - collision probability array,
EP(N6,N1,N2) - escape probability array, and
TP(N6,N6,N2) - transmission probability array.

This way of storing allows multiprocessor calculation of CTP arrays without causing any memory conflicts, i.e., each processor calculates all probabilities for one energy group. Also, it allowed highly efficient vectorization of the solver module, FLUJ (see Tables 5, 6 and 7 for timing comparison on scalar and vector computers).

TABLE 5

CPU Time(s) and Speedup Factors for BWR Assembly Benchmark, Case 1

| | SPARC1 | SPARC2 | Risc 530 | IBM 3090 | Risc 550 | Cray XMP |
|---|---|---|---|---|---|---|
| TPGEOM | 65.07 | 28.73 | 19.30 | 17.21 | 11.09 | 11.09 |
| | (5.9) | (2.6) | (1.7) | (1.6) | (1.0) | (1.0) |

TABLE 5-continued

CPU Time(s) and Speedup Factors for BWR Assembly Benchmark, Case 1

| | SPARC1 | SPARC2 | Risc 530 | IBM 3090 | Risc 550 | Cray XMP |
|---|---|---|---|---|---|---|
| CTP | 12.49 | 5.52 | 3.77 | 2.03 | 2.17 | 1.72 |
| | (5.8) | (2.5) | (1.7) | (0.9) | (1.0) | (0.8) |
| FLUJ | 21.93 | 9.49 | 2.55 | 1.24 | 1.59 | 0.40 |
| | (13.8) | (6.0) | (1.6) | (0.8) | (1.0) | (0.25) |
| GTRAN2 | 99.49 | 43.74 | 25.62 | 20.48 | 14.85 | 13.21 |
| | (6.7) | (2.9) | (1.7) | (1.4) | (1.0) | (0.9) |

TABLE 6

CPU Time(s) and Speedup Factors for BWR Assembly Benchmark, Case 2

| | SPARC1 | SPARC2 | Risc 530 | IBM 3090 | Risc 550 | Cray XMP |
|---|---|---|---|---|---|---|
| TPGEOM | 139.23 | 57.47 | 50.22 | 45.74 | 29.24 | 30.85 |
| | (4.8) | (2.0) | (1.7) | (1.6) | (1.0) | (1.1) |
| CTP | 26.56 | 10.58 | 7.92 | 4.06 | 4.86 | 3.36 |
| | (5.5) | (2.2) | (1.6) | (0.8) | (1.0) | (0.7) |
| FLUJ | 128.07 | 55.16 | 14.45 | 6.55 | 8.97 | 1.54 |
| | (14.3) | (6.1) | (1.6) | (0.7) | (1.0) | (0.2) |
| GTRAN2 | 293.86 | 123.21 | 72.59 | 56.35 | 43.07 | 35.75 |
| | (6.8) | (2.9) | (1.7) | (1.3) | (1.0) | (0.8) |

TABLE 7

CPU Time(s) and Speedup Factors for BWR Assembly Benchmark, Case 3

| | SPARC1 | SPARC2 | Risc 530 | IBM 3090 | Risc 550 | Cray XMP |
|---|---|---|---|---|---|---|
| TPGEOM | 285.66 | 114.15 | 116.33 | 98.54 | 60.96 | 67.96 |
| | (4.7) | (1.9) | (1.9) | (1.6) | (1.0) | (1.1) |
| CTP | 47.44 | 19.39 | 15.44 | 7.26 | 9.32 | 5.87 |
| | (5.1) | (2.1) | (1.7) | (0.8) | (1.0) | (0.6) |
| FLUJ | 452.32 | 187.47 | 48.45 | 20.76 | 29.11 | 4.40 |
| | (15.5) | (6.4) | (1.7) | (0.7) | (1.0) | (0.15) |
| GTRAN2 | 785.42 | 321.01 | 180.22 | 126.56 | 99.39 | 78.23 |
| | (7.9) | (3.2) | (1.8) | (1.3) | (1.0) | (0.8) |

On computing systems with relatively small amount of memory, collision/transfer probability matrices are stored in 2D arrays, i.e., the energy group as a third dimension is removed. This means that the CTP data for different energy groups must be stored into a file, thus causing a considerable number of slow I/O operations during the solver calculations.

As an example, the test problem with the following set of parameters:

N1=680, N2=6, N3=350, N4=30,
N5=80, N6=105, N7=100, N8=150 required in total 5.96 MWords of memory, of the CTP matrices are stored in 3D arrays.

Procedures to Compile, Link and Execute GTRAN2

In this section several simple procedures to compile, link and execute GTRAN2 on various workstations and mainframe computers will be given.

Procedures on Cray X-MP/18

To compile GTRAN2 modules (main.f, tpgeom.f, and tpxy.f) create an executable file gtran2.exe using UNICOS, and execute GTRAN2, use the procedures given in FIGS. 13 and 14.

Procedures on IBM 3090/600J

To compile GTRAN2 modules (MAIN FORTRAN A, TPGEOM FORTRAN A, and TPXY FORTRAN A) create an executable file GTRAN2 MODULE A under VCMS(XA), and execute GTRAN2, use the procedures given in FIGS. 15 and 16.

Procedures on the Sun SPARCstation

To compile GTRAN2 modules (main.f, tpgeom.f, and tpxy.f) and create an executable file gtran2.exe, execute the make file in FIG. 17.

To execute gtran2.exe, the user can use the following command gtran2.exe<tpg.in>gtran2.out making sure that the file TPXY.IN exists in the same directory. In this command, tpg.in is a standard input file on logical unit 5, and gtran2.out is a standard output file on logical unit 6.

Procedures on the IBM RISC 6000 workstation

To compile GTRAN2 modules (main.f, tpgeom.f, and tpxy.f) and create an executable file gtran2.exe, execute the make file in FIG. 18. In this example a C timing routine ftimes.c has been used to provide CPU times in seconds.

To execute gtran2.exe, the user can use the following command gtran2.exe<tpg.in>gtran2.out making sure that the file TPXY.IN exists in the same directory.

PWR Assembly Problem

Figure 19:
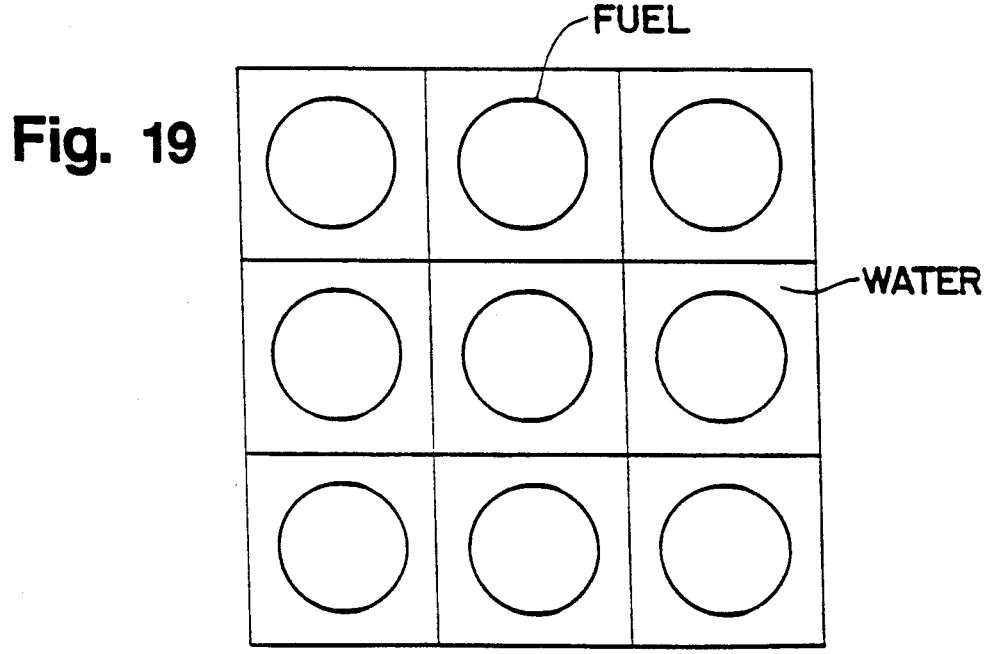
FIG. 19 illustrates a PWR assembly with simplified fuel pins.

The nine-cell PWR assembly geometry is shown in FIG. 19. The fuel rod geometry is simplified, i.e., there is no gap or cladding. The fuel rod radius is 0.409575 cm, and the lattice pitch is 1.25984 cm. The material properties are as follows:

| Fuel: | Material = $UO_2$, density = 10.4025 $g/cm^3$, temperature = 296 K, |
|---|---|
| U-238: | 85.5909 weight percent, |
| U-235: | 2.55626 weight percent, |
| O: | 11.85284 weight percent, |
| Moderator: | Material = $H_2O$, density = 1.005 $g/cm^3$, temperature = 296 K, |
| O: | 88.81 weight percent, |
| H: | 11.19 weight percent. |

CASMO-3 with 40-group cross-section library was used to generate a two-group cross-section data for this test problem. CASMO-3 has been modified in order to extract the sets of cross-section data before and after the 2D homogenization process. The CASMO-3 input cards are shown in FIG. 20. CASMO-3 was run for ⅛ of the assembly, and the following value for $k\infty$ was obtained:

$k\infty = 1.40326$.

Note that the 2D transport calculation in CASMO-3 is done with homogenized pin cells.

Using the cross-sections generated by CASMO-3, TPXY.IN (the GTRAN2 input on unit 20) has been generated and used for both homogenized and heterogeneous PWR test problems. Note that material number 1 is FUEL, material number 2 is WATER, and material number 3 is homogenized fuel and water.

More details about the GTRAN2 combinatorial geometry input generation (logical unit 5) for homogeneous and heterogeneous PWR test problems can be found in the following subsections.

Homogenized Pin Cells

GTRAN2 combinatorial geometry inputs were generated for the following three cases:
a) PWR Test Case 1 - Homogenized pin cells with 1 mesh per pin cell,
b) PWR Test Case 2 - Homogenized pin cells with 2×2 meshes per pin cell,
c) PWR Test Case 3 - Homogenized pin cells with 3×3 meshes per pin cell.

The edit region geometry as well as the zone geometries for all three cases are given in FIG. 21.

As can be seen from FIG. 21, Case 1 consists of 9 volumetric zones and 12 zones on the external boundary, Case 2 consists of 36 volumetric zones and 24 zones on the external boundary and Case 3 consists of 81 volumetric zones and 36 zones on the external boundary.

The eigenvalue results for these three cases are given in Table 8. Convergence of GTRAN2 was tested for 10, 20 and 40 integration angles and for the distance between the equidistant parallel integration lines of 0.2 cm, 0.1 cm and 0.05 cm.

TABLE 8

GTRAN2 eigenvalue spatial convergence for PWR assembly with homogenized pin cells

| Number of angles | Step (cm) | Mesh (1 × 1) | Mesh (2 × 2) | Mesh (3 × 3) |
|---|---|---|---|---|
| 10 | 0.2 | 1.40322 | 1.40321 | 1.40321 |
|    | 0.1 | 1.40322 | 1.40321 | 1.40321 |
|    | 0.05 | 1.40322 | 1.40321 | 1.40321 |
| 20 | 0.05 | 1.40322 | 1.40321 | 1.40321 |
| 40 | 0.05 | 1.40322 | 1.40321 | 1.40321 |

Heterogeneous Pin Cells

Figure 22:
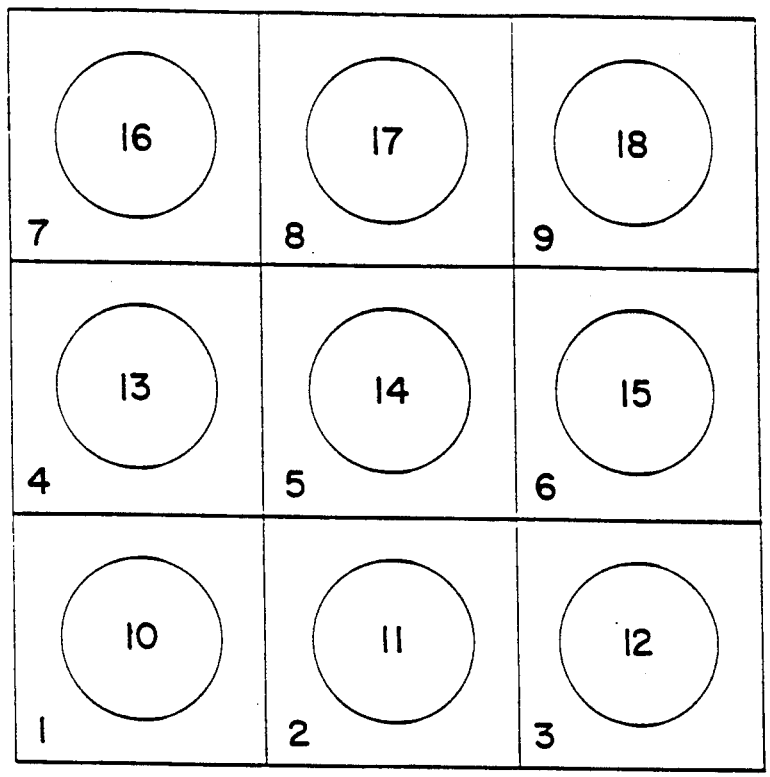
FIG. 22 illustrates the zone and edit region numbers for heterogeneous PWR cases.
Figure 22:
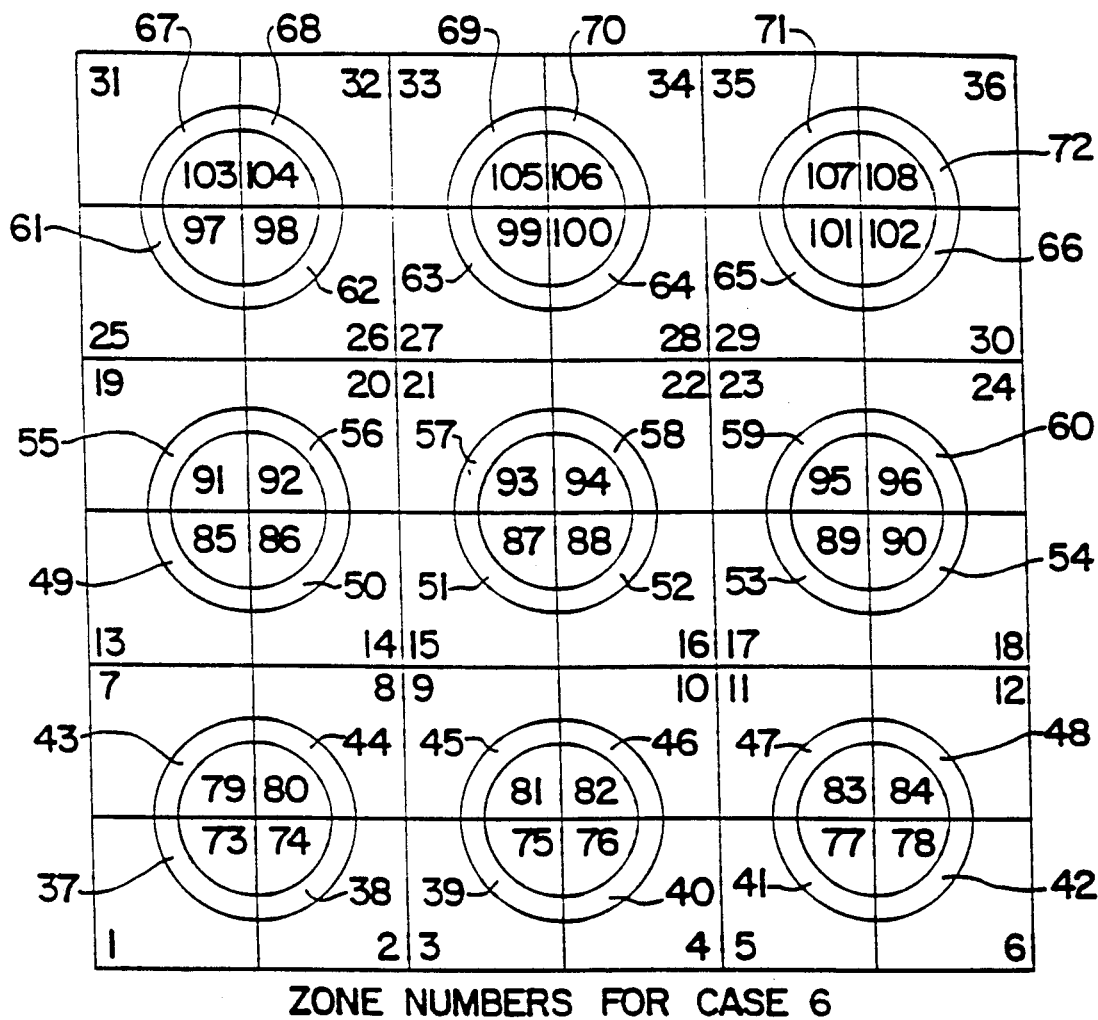

GTRAN2 combinatorial geometry inputs were generated for the following three cases:
a) PWR Test Case 4 - Heterogeneous pin cells with 1 mesh per fuel region and 1 mesh per moderator region,
b) PWR Test Case 5 - Heterogeneous pin cells with 2×2 meshes per fuel region and 2×2 meshes per moderator region,
c) PWR Test Case 6 - Heterogeneous pin cells with fuel region divided into 2 zones radially and 4 zones azimuthally, and 2×2 meshes per moderator region, The edit region geometry as well as the zone geometries for all three cases are given in FIG. 22. As can be seen, Case 4 consists of 18 volumetric zones and 9 zones on the external boundary, Case 5 consists of 72 volumetric zones and 24 zones on the external boundary, and Case 6 consists of 108 volumetric zones and 24 zones on the external boundary.

Figure 23:
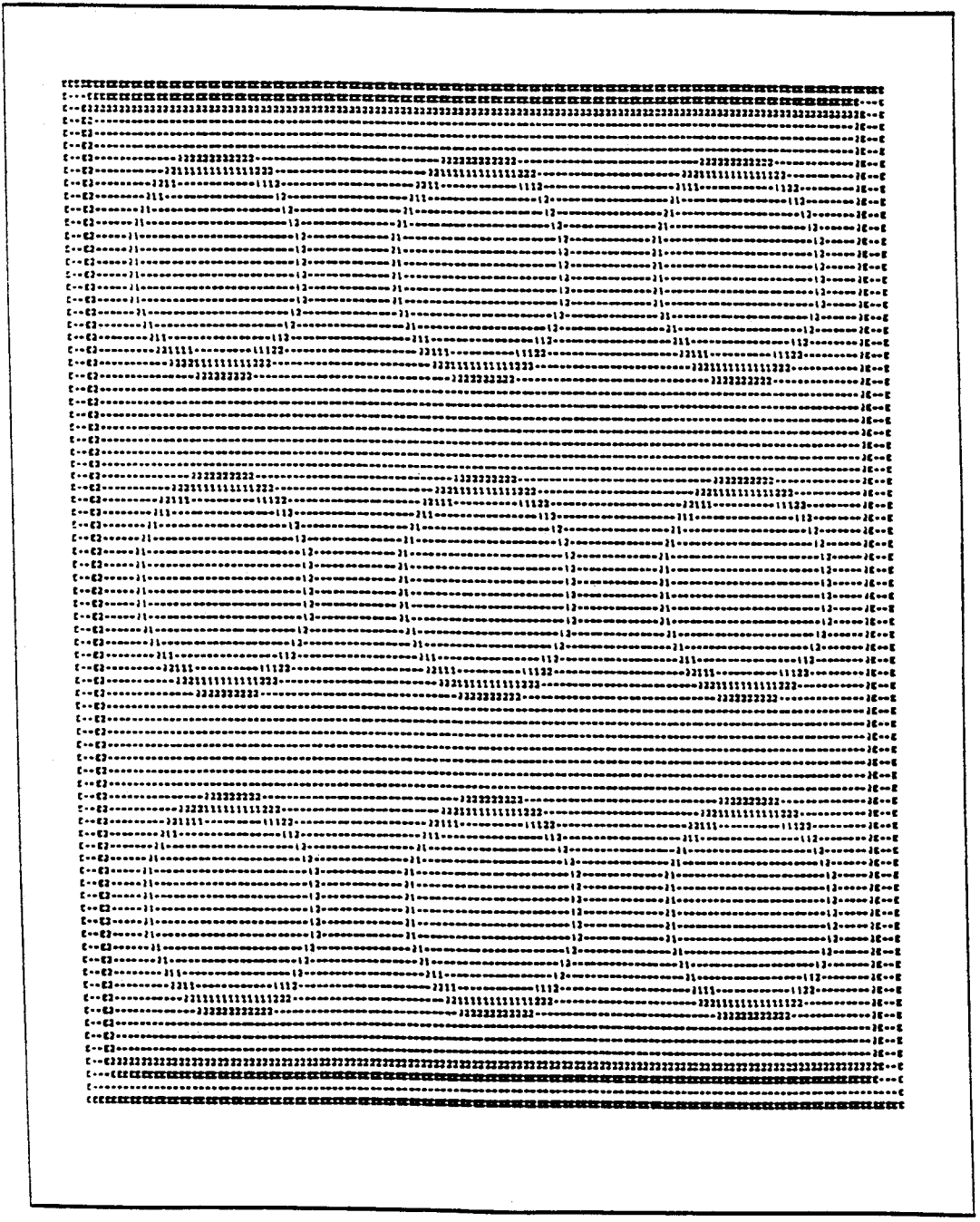
FIG. 23 illustrates the material geometry for Case 5, plotted by GTRAN2.
Figure 24:
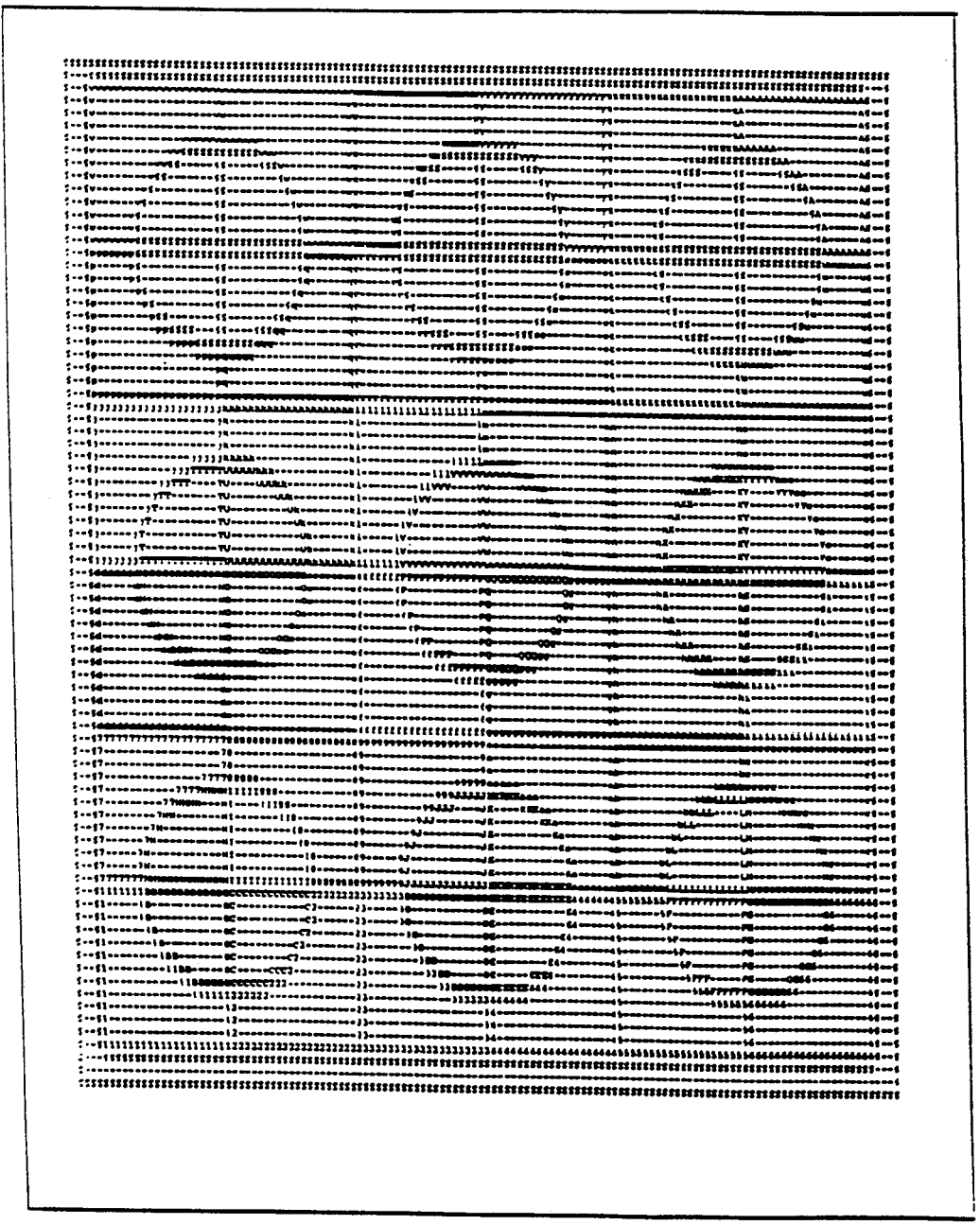
FIG. 24 illustrates the zone geometry for Case 5, plotted by GTRAN2.
Figure 25:
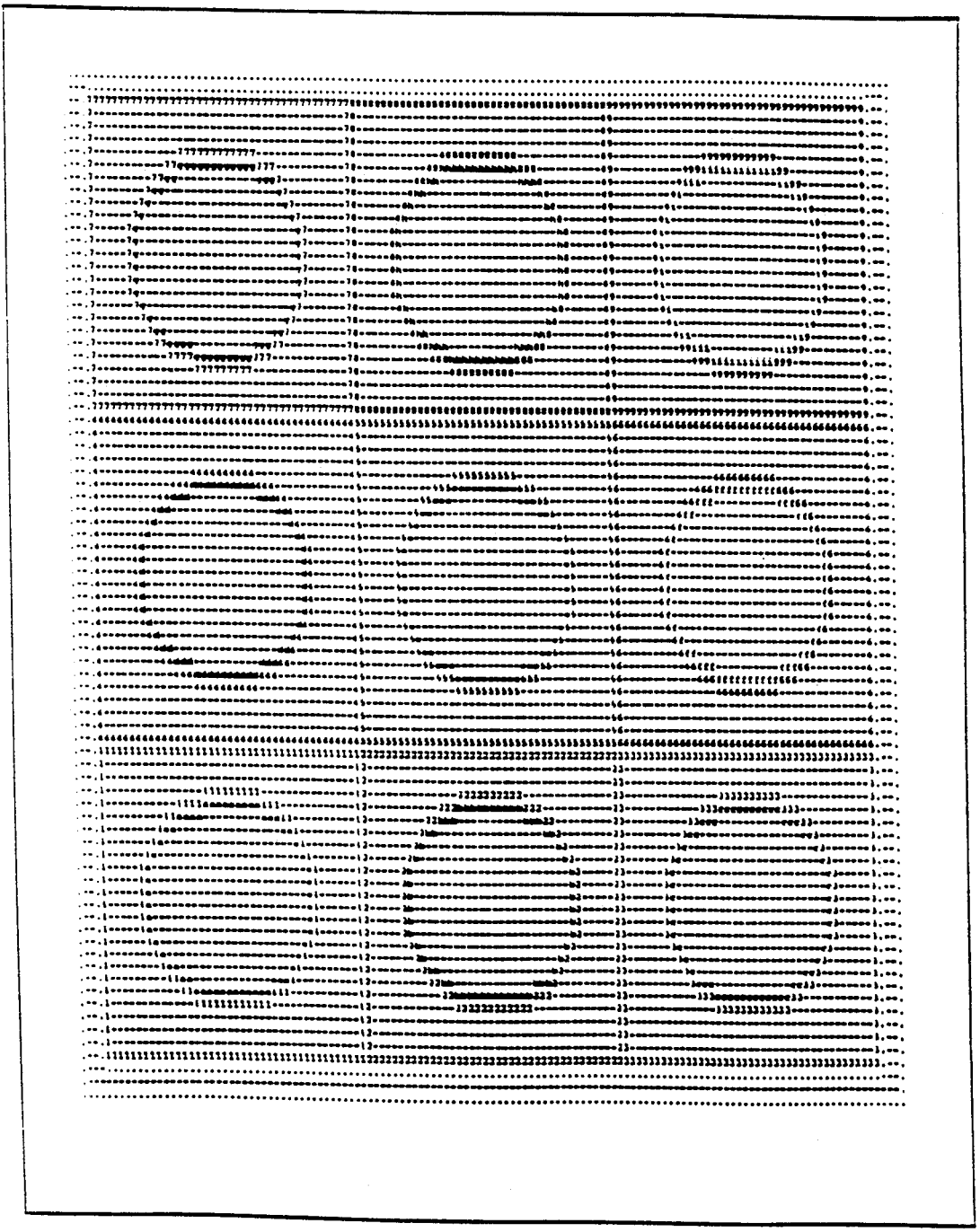
FIG. 25 illustrates the edit region geometry for Case 5, plotted by GTRAN2.

The best way to test the combinatorial geometry input is to request a "printer plotting" of material, zone and/or edit region geometries. To do this, the user should turn on the plotting flag in Card Type 02 (Appendix A), i.e., IPICT=1, and turn off the TPXY flag in Card Type 01, ITPXY=0. The type of the plot is chosen in Card Type 11 (Appendix A), i.e., IRG=0 - plot zone geometry, IRG=1 - plot material geometry, or IRG=−1 - plot edit region geometry. The "printer plotting" for Case 5 is shown in FIGS. 23-25.

The eigenvalue results for these three cases are given in Table 9. Convergence of GTRAN2 was tested for 10, 20 and 40 integration angles, and for the distance between the equidistant parallel integration lines of 0.2 cm, 0.1 cm and 0.05 cm.

TABLE 9

GTRAN2 eigenvalue spatial convergence for PWR assembly with heterogeneous pin cells

| Number of angles | Step (cm) | Case 4 | Case 5 | Case 6 |
|---|---|---|---|---|
| 10 | 0.2 | 1.40264 | 1.40249 | 1.40242 |
|  | 0.1 | 1.40287 | 1.40284 | 1.40278 |
|  | 0.05 | 1.40292 | 1.40290 | 1.40285 |
| 20 | 0.05 | 1.40306 | 1.40305 | 1.40300 |
| 40 | 0.05 | 1.40318 | 1.40317 | 1.40308 |

BWR Benchmark Problem

Another test problem, the well-known two-group BWR assembly benchmark problem has been analyzed.

Figure 26:
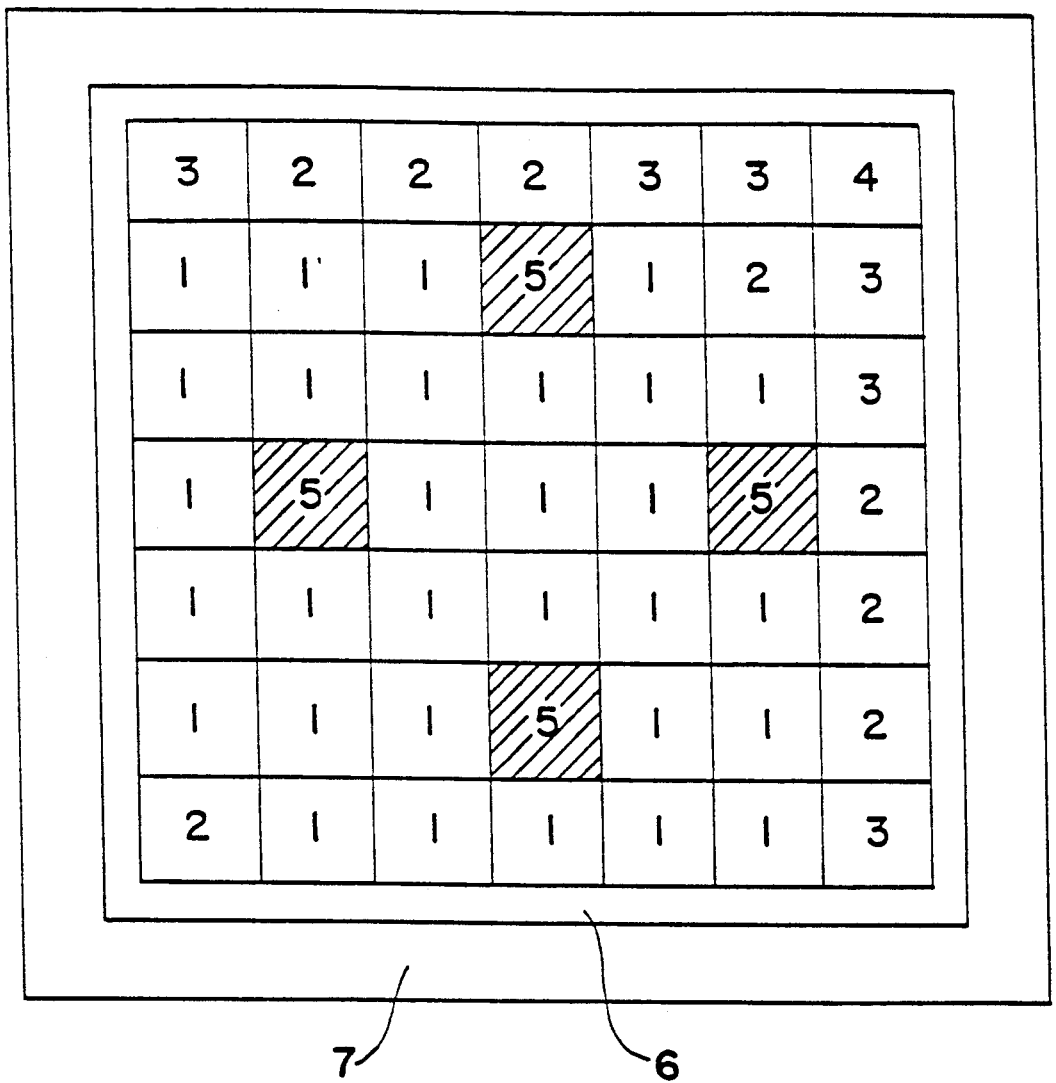
FIG. 26 illustrates the BWR assembly benchmark problem description.

The BWR assembly consists of homogenized pin cells with four different fuel types (regions 1–4), gadolinium pins (region 5), assembly walls (region 6) and water gaps (region 7), as shown in FIG. 26. The two-group cross-sections are given in Table 10. The GTRAN2 inputs on logical unit 5 (with 2×2 meshes per pin cell) and logical unit 20 are given in Appendix D.

Convergence of GTRAN2 was tested for 1×1, 2×2, 3×3 and 4×4 meshes per pin cell, for 10, 20 and 40 integration angles and for the distance between the equidistant parallel integration lines of 0.2 cm, 0.1 cm and 0.05 cm.

TABLE 10

Two-group constants for BWR benchmark problem

| Material | Group | $\Sigma_f$(cm$^{-1}$) | $\Sigma_a$(cm$^{-1}$) | $\nu\Sigma_f$(cm$^{-1}$) | $\Sigma_t^{tr}$(cm$^{-1}$) | $\Sigma_{s1\rightarrow 2}$(cm$^{-1}$) |
|---|---|---|---|---|---|---|
| 1 | 1 | 2.281−3 | 8.983−3 | 5.925−3 | 2.531−1 | 1.069−2 |
|   | 2 | 4.038−2 | 5.892−2 | 9.817−2 | 5.732−1 | — |
| 2 | 1 | 2.003−3 | 8.726−3 | 5.242−3 | 2.536−1 | 1.095−2 |
|   | 2 | 3.385−2 | 5.174−2 | 8.228−2 | 5.767−1 | — |
| 3 | 1 | 1.830−3 | 8.578−3 | 4.820−3 | 2.535−1 | 1.112−2 |
|   | 2 | 2.962−2 | 4.717−2 | 7.200−2 | 5.797−1 | — |
| 4 | 1 | 1.632−3 | 8.480−3 | 4.337−3 | 2.533−1 | 1.113−2 |
|   | 2 | 2.428−2 | 4.140−2 | 5.900−2 | 5.837−1 | — |
| 5 | 1 | 2.155−3 | 9.593−3 | 5.605−3 | 2.506−1 | 1.016−2 |
|   | 2 | 9.968−2 | 1.626−1 | 2.424−2 | 5.853−1 | — |
| 6 | 1 | — | 1.043−3 | — | 2.172−1 | 9.095−5 |
|   | 2 | — | 4.394−3 | — | 4.748−1 | — |
| 7 | 1 | — | 1.983−4 | — | 2.476−1 | 3.682−2 |
|   | 2 | — | 7.796−3 | — | 1.123+0 | — |

TABLE 11

GTRAN2 eigenvalue spatial convergence for BWR benchmark problem

| Number of angles | Step (cm) | Mesh (1 × 1) | Mesh (2 × 2) | Mesh (3 × 3) | Mesh (4 × 4) |
|---|---|---|---|---|---|
| 10 | 0.2 | 1.08637 | 1.08737 | 1.08778 | 1.08783 |
|    | 0.1 | 1.08638 | 1.08738 | 1.08779 | 1.08787 |
|    | 0.05 | 1.08639 | 1.08739 | 1.08779 | 1.08786 |
| 20 | 0.2 | 1.08630 | 1.08729 | 1.08768 | 1.08777 |
|    | 0.1 | 1.08630 | 1.08731 | 1.08771 | 1.08778 |
|    | 0.05 | 1.08631 | 1.08731 | 1.08771 | 1.08778 |
| 40 | 0.2 | 1.08629 | 1.08730 | 1.08772 | 1.08778 |
|    | 0.1 | 1.08629 | 1.08729 | 1.08770 | 1.08776 |
|    | 0.05 | 1.08630 | 1.08730 | 1.08770 | 1.08777 |

NP-MHTGR Assembly Problem

Figure 27:
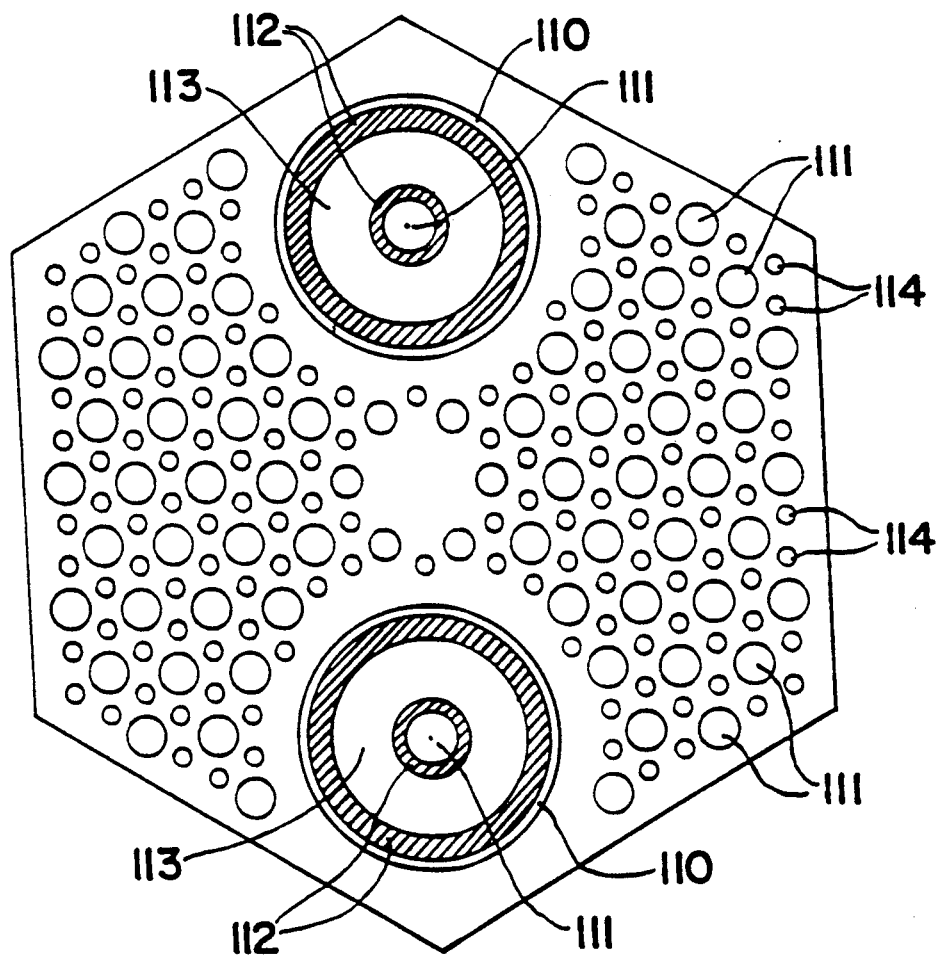
FIG. 27 illustrates the material layout for the NP-MHTGR assembly.

The NP-MHTGR reactor has a helium-cooled, graphite-moderated, graphite-reflected annular core formed from prismatic graphite fuel blocks. The fuel blocks have a geometrically complex layout: they are built from hexagonal graphite blocks with axial cylindrical channels for coolant flow or insertion of highly enriched fuel compacts and lithium absorbers. The material layout for NP-MHTGR assemblies is shown in FIG. 27.

The meshing for the GTRAN2 calculation is shown in FIG. 28. The total number of zones in the collision/transfer probability calculations is 690, with 70 edit regions (FIG. 28). As can be seen, the graphite block is divided mostly into hexagonal zones with corners in the fuel holes. Absorber compacts are divided into 4x6 zones radially. In order to test the GTRAN2 capabilities, each fuel pin was divided into 3 radial zones, although this is not necessary for obtaining an accurate result. In addition, the external assembly boundary was subdivided into 96 meshes in the CTP calculations.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. A method for analyzing neutron transport including determining neutron collision/transfer cross-section in a nuclear reactor assembly, wherein said nuclear reactor assembly includes neutron moderating and neutron absorbing elements arranged in a given configuration and comprised of selected materials, said method comprising the steps of:

determining appropriate geometric representations of the configuration and materials of said nuclear reactor assembly;

generating a fixed inner frame containing said geometric representations of said nuclear reactor assembly;

generating an outer frame comprised of a plurality of parallel equidistant rays, wherein each of said rays corresponds to a respective path of travel of a neutron;

rotating said outer frame relative to said fixed inner frame whereby said rays pass through the geometric representations of said nuclear reactor assembly to provide a mesh-independent ray trace of the neutrons in said nuclear reactor assembly;

calculating the collision/transfer probabilities and cross-section of the neutrons in said nuclear reactor assembly; and applying said calculated collision/transfer probabilities and cross-section of the neutrons to said geometric representations of the configuration and materials of said nuclear reactor assembly.

2. The method of claim 1 wherein the step of generating said fixed inner frame containing geometric representations of said nuclear reactor assembly includes utilizing a Monte Carlo code in describing the geometric configuration of said nuclear reactor assembly.

3. The method of claim 2 wherein the step of generating said fixed inner frame further includes defining zone boundaries in said nuclear reactor assembly, said method further comprising the step of calculating an intercept of a neutron track with a zone boundary of said nuclear reactor assembly.

4. The method of claim 3 wherein the step of generating said fixed inner frame employs combinatorial geometry wherein a predetermined set of geometric bodies are logically combined to provide a number of different shapes of said nuclear reactor assembly for analysis.

5. The method of claim 1 further comprising the step of varying the energy of the neutrons over a predetermined energy range in calculating the collision/transfer probabilities and cross-section of the neutrons over said predetermined energy range.

6. The method of claim 1 wherein said fixed inner frame contains geometric representations of a boiling water reactor assembly.

7. The method of claim 1 wherein said fixed inner frame contains geometric representations of a helium cooled, graphite-moderated reactor assembly.

8. The method of claim 1 wherein the steps of generating said fixed inner frame and said outer frame and rotating said outer frame relative to said inner frame are independent of the calculation of collision/transfer probabilities and cross-section of the neutrons.

9. A method for analyzing neutron transport including determining neutron collision/transfer cross-section in a nuclear reactor assembly, wherein said nuclear reactor assembly includes neutron moderating and neutron absorbing elements arranged in a given configuration and comprised of selected materials, said method comprising the steps of:

determining appropriate geometric representations of the configuration and materials of said nuclear reactor assembly;

generating a fixed inner frame containing said geometric representations of said nuclear reactor assembly including utilizing a Monte Carlo code in describing the geometric configuration of said nuclear reactor assembly and employing combinatorial geometry wherein a predetermined set of geometric bodies are logically combined to provide a number of different shapes of said nuclear reactor assembly for analysis; generating an outer frame comprised of a plurality of parallel equidistant rays, wherein each of said rays corresponds to a respective path of travel of a neutron;

rotating said outer frame relative to said fixed inner frame whereby said rays pass through the geometric representations of said nuclear reactor assembly to provide a mesh-independent ray trace of the neutrons in said nuclear reactor assembly;

varying the energy of the neutrons being analyzed over a predetermined energy range;

calculating the collision/transfer probabilities and cross-section of the neutrons in said nuclear reactor assembly for various nuclear reactor assembly geometries over a range of neutron energies; and applying said calculated collision/transfer probabilities and cross-section of the neutrons to said geometric representations of the configuration and materials of said nuclear reactor assembly.

10. Apparatus for analyzing neutron transport including determining neutron collision/transfer cross-section in a nuclear reactor assembly, wherein said nuclear reactor assembly includes neutron moderating and neutron absorbing elements arranged in a given configuration and comprised of selected materials, said apparatus comprising:

first means for determining appropriate representation of the configuration and materials of said nuclear reactor assembly;

second combinatorial geometry means for generating a fixed inner frame containing said geometric representations of said nuclear reactor assembly by combining a predetermined set of geometric bodies to provide a number of different shapes of said nuclear reactor assembly;

third ray generating means for generating an outer frame comprised of a plurality of parallel equidistant rays, wherein each of said rays corresponds to a respective path of travel of a neutron;

fourth means for rotating said outer frame relative to said fixed inner frame whereby said rays pass through the geometric representations of said nuclear reactor assembly to provide a mesh-independent ray trace of the neutrons in said nuclear reactor assembly;

calculating means for determining the collision/transfer probabilities and cross-section of the neutrons in said nuclear reactor assembly; and fifth means for applying said calculated collision/transfer probabilities and cross-section of the neutrons to said geometric representations of the configuration and materials of said nuclear reactor assembly.

11. The apparatus of claim 10 wherein said second combinatorial geometry means for generating said fixed inner frame includes geometric representations of said nuclear reactor assembly utilizing a Monte Carlo code in describing the geometric configuration of said nuclear reactor assembly.

12. The apparatus of claim 11 wherein said second combinatorial geometry means for generating said fixed inner frame further includes zone boundaries of said nuclear reactor assembly, said apparatus further comprising means for calculating an intercept of a neutron track with a zone boundary of said nuclear reactor assembly.

13. The apparatus of claim 10 further comprising energy varying means for varying the energy of the neutrons over a predetermined energy range in calculating the collision/transfer probabilities and cross-section of the neutrons over said predetermined energy range.

14. The apparatus of claim 10 wherein said second combinatorial geometry means for generating said fixed inner frame contains geometric representations of a boiling water reactor assembly.

15. The apparatus of claim 10 wherein said second combinatorial geometry means for generating said fixed inner frame contains geometric representations of a helium cooled, graphite-moderated reactor assembly.

16. The apparatus of claim 10 wherein said second combinatorial geometry means for generating said fixed inner frame, said third ray generating means for generating said outer frame, and said fourth means for rotating said outer frame relative to said inner frame are independent of the calculation of collision/transfer probabilities and cross-section of the neutrons.

17. Apparatus for analyzing neutron transport including determining neutron collision/transfer cross-section in a nuclear reactor assembly, wherein said nuclear reactor assembly includes neutron moderating and neutron absorbing elements arranged in a given configuration and comprised of selected materials, said apparatus comprising:

first means for determining appropriate representations of the configuration and materials of said nuclear reactor assembly;

second Monte Carlo code and combinatorial geometry means for generating a fixed inner frame containing said geometric representations of said nuclear reactor assembly for describing the geometric configuration of said nuclear reactor assembly and for combining a predetermined set of geometric bodies to provide a number of different shapes of said nuclear reactor assembly for analysis;

third ray generating means for generating an outer frame comprised of a plurality of parallel equidistant rays, wherein each of said rays corresponds to a respective path of travel of a neutron;

fourth means for rotating said outer frame relative to said fixed inner frame whereby said rays pass through the geometric representations of said nuclear reactor assembly to provide a mesh-independent ray trace of the neutrons in said nuclear reactor assembly;

fifth means for varying the energy of the neutrons being analyzed over a predetermined energy range;

calculating means for determining the collision/transfer probabilities and cross-section of the neutrons in said nuclear reactor assembly for various nuclear reactor assembly geometries over a range of neutron energies; and sixth means for applying said calculated collision/transfer probabilities and cross-section of the neutrons to said geometric representations of the configuration and materials of said nuclear reactor assembly.

* * * * *